(12) United States Patent
Kurane et al.

(10) Patent No.: US 8,310,562 B2
(45) Date of Patent: Nov. 13, 2012

(54) IMAGING CONTROL APPARATUS, IMAGING APPARATUS AND IMAGING CONTROL METHOD FOR COMPRESSING THE DYNAMIC RANGE OF IMAGE DATA

(75) Inventors: Haruhisa Kurane, Shiojiri (JP); Masanobu Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 303 days.

(21) Appl. No.: 12/723,891

(22) Filed: Mar. 15, 2010

(65) Prior Publication Data

US 2010/0328490 A1  Dec. 30, 2010

(30) Foreign Application Priority Data

Jun. 26, 2009  (JP) .................................. 2009-152604

(51) Int. Cl.
*H04N 5/235* (2006.01)
*H04N 5/202* (2006.01)
(52) U.S. Cl. ................... 348/229.1; 348/222.1; 348/254
(58) Field of Classification Search ............... 348/229.1, 348/222.1, 254
See application file for complete search history.

(56) References Cited

U.S. PATENT DOCUMENTS

2005/0117799 A1* 6/2005 Fuh et al. ...................... 382/169

FOREIGN PATENT DOCUMENTS

JP    A-2005-284534    10/2005

* cited by examiner

*Primary Examiner* — Timothy J Henn
*Assistant Examiner* — Joel Fosselman
(74) *Attorney, Agent, or Firm* — Oliff & Berridge, PLC

(57) ABSTRACT

An imaging control apparatus includes an HDR signal processor and a frame memory. The HDR signal processor obtains pixel data S1 and S2 obtained by imaging with a very short exposure time T1 and a short exposure time T2 earlier than obtaining pixel data S3 obtained by imaging with a normal exposure time T3, generates a luminance image data by separating illumination light component from the pixel data S1 and S2, the generation of the luminance image data starting when the pixel data S2 is obtained, and generates a gain for tone mapping from the luminance image data. On the other hand, the HDR signal processor generates an HDR image data from the pixel data S1 to S3, the generation of the HDR image starting when the pixel data S3 is obtained, and performs tone mapping by multiplying this image data by the gain.

10 Claims, 9 Drawing Sheets

IMAGING CONTROL APPARATUS, IMAGING APPARATUS AND IMAGING CONTROL METHOD FOR COMPRESSING THE DYNAMIC RANGE OF IMAGE DATA

The present application claims the priority of JP-2009-152604, filed on Jun. 26, 2009, which is incorporated by reference herein.

TECHNICAL FIELD

An aspect of the present invention relates to an imaging apparatus and, more particularly, to an imaging control apparatus, an imaging apparatus, an imaging control method and the like suitable for reducing the amount of time taken for compressing the dynamic range of image data.

BACKGROUND ART

In one conventional technique, a plurality of versions of image data obtained by imaging with different lengths of exposure time are combined to generate dynamic-range-expanded image data (i.e., HDR image data). However, since HDR image data has a very wide dynamic range of, for example, 20-bit or the like, many of the existing display devices having a relatively narrow dynamic range of, for example, 8-bit or the like can not display HDR image data as it is. So, the dynamic range of HDR image data has needed to be converted to the dynamic range of the existing display devices.

One example of a method for converting the dynamic range of HDR image data is to convert a high dynamic range (HDR) image into a low dynamic range (LDR) image, as described in Patent Document 1.

Methods for converting an HDR image into a high-contrast LDR image is commonly called "tone mapping" or "dynamic range compression." These methods perform dynamic range compression while maintaining good color reproducibility from dark area (shadow) to bright area (highlight).

[Prior Art References]
[Patent Documents]
  [Patent Document 1] JP-A-2005-284534

SUMMARY OF THE INVENTION

Problems to be Solved by the Invention

However, in the conventional methods including one described in Patent Document 1, tone mapping is performed on a computer. In order to obtain HDR (High Dynamic Range) image data, a plurality of versions of image data imaged with different lengths of exposure time using a digital camera or the like are needed. Alternatively, a plurality of versions of image data imaged using a digital camera or the like having a plurality of imaging sections (pixel groups) having different sensitivities are needed. Then, conventionally, all of the plurality of versions of image data need to be obtained before image processing including HDR image data generation and tone mapping is performed step by step on a computer.

Also, in order to obtain "blurred" image data for tone mapping by separating (extracting) illumination light component from HDR image data, HDR image data need to be filtered with a low-pass filter (LPF). This filtering consumes many computing resources and takes a lot of processing time. Accordingly, blurred image generation will take a long time, making it difficult to convert HDR image data to LDR image data to create a moving image in real time.

The present invention is directed to solve the above-described problem that has not been solved in the conventional methods. According to some aspects of the invention, an imaging control apparatus, an imaging apparatus and an imaging control method can be provided that are suitable for reducing the amount of time taken for compressing the tonal range (dynamic range) of the luminance of image data.

Means for Solving the Problems

[Aspect 1]

In order to achieve the above object, according to Aspect 1, there is provided an imaging control apparatus including:

an image data obtaining unit for obtaining at least one version of image data of a plurality of versions of image data obtained by imaging an object using an imaging device with different lengths of exposure time;

a combined image data obtaining unit for obtaining a first combined image data obtained by combining at least two or more versions of image data of the plurality of versions of image data;

a gain distribution generation unit for generating a gain distribution that is a distribution of gain factors to be used for compressing the tonal range of luminance of the first combined image data based on the image data obtained by the image data obtaining unit; and a tonal conversion unit for converting the tonal range of luminance of the first combined image data obtained by the combined image data obtaining unit to a tonal range narrower than the original tonal range based on a gain distribution generated by the gain distribution generation unit.

In this configuration, the image data obtaining unit obtains one of the plurality of versions of image data obtained by imaging using the imaging device with different lengths of exposure time. Further, the combined image data obtaining unit obtains a first combined image data (for example, HDR image data) obtained by combining at least two or more versions of image data of the plurality of versions of image data. When these image data are obtained, the gain distribution generation unit generates a gain distribution that is a distribution of gain factors to be used for compressing the tonal range of luminance of the first combined image data. When the gain distribution is generated, the tonal conversion unit converts the tonal range of luminance of the first combined image data to a tonal range narrower than the original tonal range.

For example, the gain distribution generation unit generates a gain distribution for compressing illumination light component of the luminance component corresponding to each pixel of the first combined image data while maintaining reflectance component of the luminance component. Then, the tonal conversion unit performs tonal conversion (tone mapping) on the first combined image data using the generated gain distribution.

According to the above description, it is possible to generate a gain distribution based on at least one of the plurality of versions of image data relating to generating the first combined image data, which provides the effect of allowing the tonality to be maintained and the tonal conversion to be performed with good color reproducibility over the whole dynamic range.

Also, for example, using image data output earlier from the imaging device of the plurality of versions of image data for generating a gain distribution allows the gain distribution generation unit to start generating a gain distribution before a unit for generating the first combined image data generates the first combined image data.

This provides the effect of allowing the difference of the delay between the time of completing generating the first combined image data and the time of completing generating a gain distribution to be reduced.

When the imaging control apparatus includes a functional part for generating the first combined image data, the combined image data obtaining unit obtains the first combined image data from the functional part. When an external apparatus such as imaging device has a function of generating the first combined image data, the combined image data obtaining unit obtains the first combined image data from the external apparatus.

[Aspect 2]

Further, according to Aspect 2, there is provided the imaging control apparatus according to Aspect 1, in which the imaging device, capable of reading pixel signals from each pixel in a non-destructive reading mode for reading a pixel signal depending on charge accumulated in the pixel while maintaining the charge accumulated, exposes the each pixel with the different lengths of exposure time in the order of exposure time from shortest to longest, reads the pixel signals from the each exposed pixel in the non-destructive reading mode, and outputs data of the pixel signals in the order of reading.

In this configuration, since the imaging device can read pixel signals from each pixel in the non-destructive mode, it is possible to sequentially read pixel signals with different lengths of exposure time in the order of exposure time from shortest to longest.

Accordingly, it is possible to reduce the length of time for obtaining the two or more versions of image data to be used for generating the first combined image data. Further, using image data with shorter exposure time for generating a gain distribution makes it possible to ensure a longer time interval (for generating the gain distribution) between obtaining the image data with shorter exposure time and generating the first combined image data.

This provides the effect of allowing the difference of the delay between the time of completing generating the first combined image data and the time of completing generating a gain distribution to be further reduced.

Especially, in the application requiring real-time operation such as car-mounted camera or machine vision, this configuration is effective in obtaining combined images (video) tonal-converted depending on the tone of an output apparatus in almost real time.

[Aspect 3]

Further, according to Aspect 3, there is provided the imaging control apparatus according to Aspect 1 or 2, further including a combined image data generation unit for combining at least two or more versions of image data of the plurality of versions of image data obtained by imaging to generate the first combined image data.

In this configuration, it is possible to obtain at least two or more versions of image data of the plurality of versions of image data obtained by imaging with different lengths of exposure time and to combine the obtained pixel data, thereby generating the first combined image data.

Also, in this configuration, the combined image data obtaining unit obtains the first combined image data generated by the combined image data generation unit.

[Aspect 4]

Further, according to Aspect 4, there is provided the imaging control apparatus according to Aspect 3, in which the image data obtaining unit obtains the image data with a exposure time shorter than the longest exposure time of the at least two or more versions of image data to be used for generating the first combined image data at least earlier than the combined image data generation unit obtains the image data with the longest exposure time, and in which the gain distribution generation unit generates the gain distribution based on the earlier obtained image data with the short exposure time.

In this configuration, it is possible to generate the gain distribution in the time interval since the gain distribution generation unit obtains from the imaging device the image data with a exposure time shorter than the longest exposure time until the combined image data generation unit obtains from the imaging device the image data with the longest exposure time.

This allows the imaging device to make effective use of the time interval until outputting the image data with the longest exposure time. This provides the effect of allowing the length of time taken to convert the tonal range of the first combined image data to be reduced.

[Aspect 5]

On the other hand, in order to achieve the above object, according to Aspect 5, there is provided an imaging control apparatus including:

an image data obtaining unit for obtaining at least one version of image data of a plurality of versions of image data obtained by imaging an object with a plurality of pixel groups having different sensitivities using an imaging device having the plurality of pixel groups;

a combined image data obtaining unit for obtaining a first combined image data obtained by combining at least two or more versions of image data of the plurality of versions of image data;

a gain distribution generation unit for generating a gain distribution that is a distribution of gain factors to be used for compressing the tonal range of luminance of the first combined image data based on the image data obtained by the image data obtaining unit; and a tonal conversion unit for converting the tonal range of luminance of the first combined image data obtained by the combined image data obtaining unit to a tonal range narrower than the original tonal range based on a gain distribution generated by the gain distribution generation unit.

In this configuration, the image data obtaining unit obtains at least one version of image data of the plurality of versions of image data obtained by imaging using the imaging device with the plurality of pixel groups having different sensitivities. Further, the combined image data obtaining unit obtains the first combined image data (for example, HDR image data) obtained by combining at least two or more versions of image data of the plurality of versions of image data. When these image data are obtained, the gain distribution generation unit generates a gain distribution that is a distribution of gain factors to be used for compressing the tonal range of luminance of the first combined image data. When the gain distribution is generated, the tonal conversion unit converts the tonal range of luminance of the first combined image data to a tonal range narrower than the original tonal range based on the gain distribution.

The amount of light entering a human eye depends on the product of the reflectance of an object and the amount of illumination light, and the perception of the human eye highly correlates with the reflectance. Based on this, for example, the gain distribution generation unit generates a gain distribution for compressing illumination light component of the luminance component corresponding to each pixel of the first combined image data while maintaining reflectance component of the luminance component. Then, the tonal conversion unit performs tonal conversion (tone mapping) on the first combined image data using the generated gain distribution.

According to the above description, it is possible to generate a gain distribution based on at least one of the plurality of versions of image data relating to generating the first combined image data, which provides the effect of allowing the tonality to be maintained and the tonal conversion to be performed with good color reproducibility over the whole dynamic range.

Also, for example, using image data output earlier from the imaging device of the plurality of versions of image data for generating a gain distribution allows the gain distribution generation unit to start generating a gain distribution before a unit for generating the first combined image data generates the first combined image data.

This provides the effect of allowing the difference of the delay between the time of completing generating the first combined image data and the time of completing generating a gain distribution to be reduced.

[Aspect 6]

Further, according to Aspect 6, there is provided the imaging control apparatus according to Aspect 5, further including a combined image data generation unit for combining at least two or more versions of image data of the plurality of versions of image data obtained by imaging to generate the first combined image data.

In this configuration, it is possible to obtain at least two or more versions of image data of the plurality of versions of image data obtained by imaging with the plurality of pixel groups having different sensitivities and to combine the obtained image data, thereby generating the first combined image data.

[Aspect 7]

Further, according to Aspect 7, there is provided the imaging control apparatus according to any one of Aspects 1 to 6, in which the gain distribution generation unit calculates the gain for each of a plurality of pixel data included in the image data to be processed to generate the gain distribution.

In this configuration, the gain for compressing the tonal range of luminance of the first combined image data is calculated for each of the plurality of pixel data of the image data to be processed, based on the image data obtained by the image data obtaining unit.

This provides the effect of allowing compression of the tonal range of luminance of the first combined image data to be precisely performed.

[Aspect 8]

Further, according to Aspect 8, there is provided the imaging control apparatus according to any one of Aspects 1 to 7, in which the gain distribution generation unit generates luminance image data by performing filtering on the image data obtained by the image data obtaining unit to extract illumination light component of the image, and generates the gain distribution based on the generated luminance image data.

This configuration provides the effect of allowing the illumination light component of the image of the obtained image data to be easily obtained by performing filtering on the image data obtained by the image data obtaining unit.

Specifically, in order to generate a distribution of gain factors for compressing illumination light component while maintaining reflectance component, filtering is desirably performed using a filter capable of transmitting illumination light component and intercepting or reducing reflectance component.

[Aspect 9]

Further, according to Aspect 9, there is provided the imaging control apparatus according to any one of Aspects 1 to 7, in which the image data obtaining unit obtains two or more versions of image data of three or more versions of image data to be used for generating the first combined image data, and in which the gain distribution generation unit combines two or more versions of image data obtained by the image data obtaining unit to generate a second combined image data, generates luminance image data by performing filtering on the generated second combined image data to extract illumination light component of the image, and generates the gain distribution based on the generated luminance image data.

In this configuration, it is possible to combine two or more versions of image data of three or more versions of image data to be used for generating the first combined image data, obtained by the image data obtaining unit, thereby generating a second combined image data and to generate a gain distribution based on the generated second combined image data.

This provides the effect of allowing a gain distribution more suitable for compressing the tonal range of luminance of the first combined image data to be generated and a higher-quality tonal-compressed image to be obtained.

[Aspect 10]

Further, according to Aspect 10, there is provided the imaging control apparatus according to Aspect 8 or 9, in which the gain distribution generation unit performs the filtering using a low-pass filter capable of transmitting illumination light component and intercepting reflectance component of the image data to be processed.

The frequency of illumination light component is lower than that of reflectance component.

Accordingly, in the above configuration, it is possible to perform filtering on the image data obtained by the image data obtaining unit, using the low-pass filter capable of transmitting illumination light component and intercepting reflectance component.

This provides the effect of allowing illumination light component to be easily separated from the image data.

[Aspect 11]

Further, according to Aspect 11, there is provided the imaging control apparatus according to any one of Aspects 8 to 10, in which the value Y' of the pixel data tonal-converted by the tonal conversion unit is calculated according to the following formula (1):

$$Y' = K(P) \times Y \quad (1)$$

where Y is the value of each pixel data of the first combined image data, P is the value of each pixel data of the luminance image data, and the K(P) is a gain corresponding to the Y.

In this configuration, the image data obtaining unit obtains the image data, and the gain distribution generation unit generates the gain distribution based on the obtained image data. Then, when the combined image data obtaining unit obtains the first combined image data, a luminance value for each pixel data of the first combined image data after the compression of illumination light component and tonal conversion is calculated according to the above formula (1).

[Aspect 12]

Further, according to Aspect 12, there is provided the imaging control apparatus according to Aspect 11, in which the gain K(P) is calculated according to the following formula (2):

$$K(P) = 1/P_L^i \quad (2)$$

where the exponent i is a positive real number less than or equal to 1, and $P_L$ is the luminance value of each pixel data of the luminance image data, normalized in the range of 0 to 1.

In this configuration, the image data obtaining unit obtains the image data, and the gain distribution generation unit generates the luminance image data based on the obtained image data. Then, a gain K(P) for each pixel of the first combined image data is calculated from the luminance value of each pixel data of the luminance image data according to the above formula (2).

[Aspect 13]

Further, according to Aspect 13, there is provided the imaging control apparatus according to Aspect 11 or 12, in which the gain distribution generation unit, having a lookup table storing data of the gain K(P) for a predetermined luminance value, generates the gain distribution by retrieving a gain K from the lookup table for each of a plurality of pixel data of the luminance image data.

In this configuration, it is possible to retrieve from the lookup table a gain K(Y) for each luminance value of a plurality of pixel data of the generated luminance image data. This provides the effect of allowing a gain distribution to be easily and quickly generated.

[Aspect 14]

Further, according to Aspect 14, there is provided the imaging control apparatus according to any one of Aspects 1 to 13, in which the gain distribution generation unit combines luminance values of each of a plurality of pixel data included in the image data to be processed, for each pixel group including a predetermined number of pixels, to reduce the size of the image data, and generates a gain distribution for the each pixel group as the gain distribution based on the reduced image data.

In this configuration, the gain distribution generation unit combines (for example, averages) luminance values of each of a plurality of pixel data included in the image data obtained by the image data obtaining unit, for each pixel group including a predetermined number of pixels, to reduce the size of the image data. Further, the gain distribution generation unit generates a gain distribution based on the reduced image data.

This allows the size of the image data to be reduced (resized), thereby simplifying successive processes (for example, filtering for generating the luminance image data).

This provides the effect of allowing the processing related to compressing the tonal range of luminance of the first combined image data to be performed more quickly.

[Aspect 15]

Further, according to Aspect 15, there is provided the imaging control apparatus according to any one of Aspects 10 to 14, in which the imaging device has color filters of primary colors of red, green and blue or their complementary colors.

In this configuration, for example, the luminance image data P having passed through the low-pass filter included in each local area of the image have approximately the same value, so their gains K are approximately the same value. Accordingly, the gains of red, green and blue pixels included in the imaging device are locally the same value, which maintains the balance among the colors of red, green and blue. This provides the effect of providing good color reproducibility.

[Aspect 16]

Further, according to Aspect 16, there is provided the imaging control apparatus according to Aspect 14, in which the imaging device has color filters corresponding to red, green and blue pixels with the combination of red, green, green and blue filters arranged in Bayer pattern, or has color filters of their complementary colors, in which the gain distribution generation unit combines pixel data of each four pixels partitioned by the color filters of the image data to be processed to reduce the size of the image data to a quarter of its size, and generates a gain distribution for the each partitioned four pixels as the gain distribution based on the reduced image data.

In this configuration, the gain distribution generation unit can combine the size of the image data obtained by the image data obtaining unit using an appropriate color component for each four colors partitioned by a color filter array 13 to resize the image to a quarter of its size. Then, it is possible to generate a gain distribution that is a distribution of gains for each area of four pixels based on the resized image data.

This allows the size of the image to be reduced (resized), thereby simplifying successive processes, which provides the effect of allowing the processing related to compressing the tonal range of luminance of the first combined image data to be performed more quickly.

[Aspect 17]

Further, according to Aspect 17, there is provided the imaging control apparatus according to any one of Aspects 1 to 16, in which the tonal conversion unit corrects the contents of the gain distribution so that the histogram of luminance of the first combined image data tonal-converted using the gain distribution will be broadened, converts the tonal range of the first combined image data using the corrected gain distribution, and performs gamma conversion on the converted first combined image data.

In this configuration, it is possible to convert the tonal range so that the histogram of the first combined image data will be broadened, and then perform gamma conversion on the converted first combined image data.

This performs gamma conversion using a tone curve after broadening the histogram, which allows the tonality to be maintained and gives the same effect as dynamic range compression.

Particularly, assuming that the luminance value Y ranges 0 to 1 in the above formula (2), when the luminance value is a small value close to 0, the gain is high, and when the luminance value is a large value close to 1, the gain is extremely close to 1. This causes, within one image, an area with dark input to be boosted by the gain to be brighter, and an area with bright input to be maintained as it is. That is, applying the gain distribution thus generated to the first combined image data allows the histogram to be broadened.

[Aspect 18]

Further, according to Aspect 18, there is provided the imaging control apparatus according to Aspect 17, including:

a tonal information obtaining unit for obtaining information on the tonal range that can be output by an output apparatus for outputting the image of the first combined image data, from the output apparatus; and a tone curve information storage unit for storing information on a plurality of type of tone curves for the tonal range that can be output, in which the tonal conversion unit uses information on a tone curve the type of which corresponds to the information obtained by the tonal information obtaining unit and stored in the tone curve information storage unit to perform gamma conversion on the broadened first combined image data.

In this configuration, the tonal information obtaining unit obtains information on the tonal range that can be output by an output apparatus for outputting the image of the first combined image data, from the output apparatus. Then, the tonal conversion unit performs gamma conversion using information on a tone curve the type of which corresponds to the obtained information, on the first combined image data the histogram of which is broadened using the corrected gain distribution.

This allows the tonal conversion depending on the image output capability of the output apparatus connected with the imaging control apparatus to be performed, which provides the effect of allowing a system flexible to the capability of the output apparatus to be easily built.

Here, the information on the tonal range includes information itself on the displayable tonal range and information from which the tonal range can be calculated, and also includes model information or the like on the output apparatus, when a data table on the displayable tonal range corresponding to the model of the output apparatus is available to the tonal conversion unit.

[Aspect 19]

Also, in order to achieve the above object, according to Aspect 19, there is provided an imaging apparatus including:

an imaging device for imaging an object with different lengths of exposure time and outputting a plurality of versions of image data corresponding to the different lengths of exposure time; and the imaging control apparatus according to any one of Aspects 1 to 4.

This configuration provides the effects equal to those of the imaging control apparatus according to any one of Aspects 1 to 4.

[Aspect 20]

Also, in order to achieve the above object, according to Aspect 20, there is provided an imaging apparatus including:

an imaging device, having a plurality of pixel groups having different sensitivities, for imaging an object with the plurality of pixel groups and outputting a plurality of versions of image data corresponding to the plurality of pixel groups; and the imaging control apparatus according to Aspect 5 or 6.

This configuration provides the effects equal to those of the imaging control apparatus according to Aspect 5 or 6.

[Aspect 21]

Also, in order to achieve the above object, according to Aspect 21, there is provided an imaging control method including:

image data obtaining step for obtaining at least one version of image data of a plurality of versions of image data obtained by imaging an object using an imaging device with different lengths of exposure time;

combined image data obtaining step for obtaining a first combined image data obtained by combining at least two or more versions of image data of the plurality of versions of image data;

gain distribution generation step for generating a gain distribution that is a distribution of gain factors to be used for compressing the tonal range of luminance of the first combined image data based on the image data obtained in the image data obtaining step; and tonal conversion step for converting the tonal range of the first combined image data obtained in the combined image data obtaining step to a tonal range narrower than the original tonal range based on a gain distribution generated in the gain distribution generation step.

This configuration provides the effects equal to those of the imaging control apparatus according to Aspect 1.

[Aspect 22]

Also, in order to achieve the above object, according to Aspect 22, there is provided an imaging control method including:

image data obtaining step for obtaining at least one version of image data of a plurality of versions of image data obtained by imaging an object with a plurality of pixel groups having different sensitivities using an imaging device having the plurality of pixel groups;

combined image data obtaining step for obtaining a first combined image data obtained by combining at least two or more versions of image data of the plurality of versions of image data;

gain distribution generation step for generating a gain distribution that is a distribution of gain factors to be used for compressing the tonal range of luminance of the first combined image data based on the image data obtained in the image data obtaining step; and tonal conversion step for converting the tonal range of the first combined image data obtained in the combined image data obtaining step to a tonal range narrower than the original tonal range based on a gain distribution generated in the gain distribution generation step.

This configuration provides the effects equal to those of the imaging control apparatus according to Aspect 5.

MODE FOR CARRYING OUT THE INVENTION

[First Embodiment]

A first embodiment of the invention is described below with reference to the drawings. FIGS. 1 to 10 show an imaging control apparatus, an imaging apparatus and an imaging control method in accordance with the first embodiment of the invention.

Figures 1, 2:
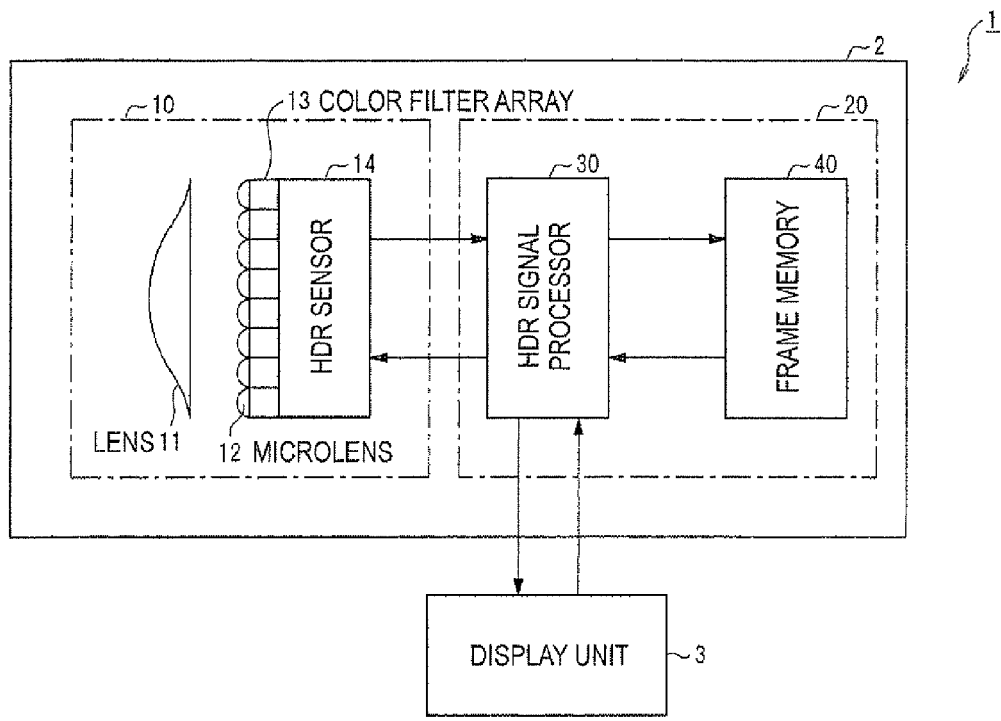
[FIG. 1] It is a block diagram showing a configuration of an imaging system 1 in accordance with the invention.
[FIG. 2] It shows a configuration of a color filter array 13.

First, a configuration of an imaging system in accordance with the invention is described with reference to FIG. 1. FIG. 1 is a block diagram showing a configuration of an imaging system 1 in accordance with the invention.

As shown in FIG. 1, the imaging system 1 includes an imaging apparatus 2 and a display apparatus 3.

The imaging apparatus 2 includes an imaging device and an imaging control apparatus 20. The imaging control apparatus 20 includes an HDR signal processor 30 and a frame memory 40.

The imaging device 10 includes a lens 11, a microlens 12, a color filter array 13 and an HDR sensor 14.

The lens 11 collects light reflected by an object and guides the collected light to the microlens 12. Note that the lens 11 may be a unifocal lens, a zoom lens, an auto iris lens or others according to an imaging condition or others.

The microlens 12 focuses the light having passed through the lens 11 into each sensor cell (pixel) of a sensor cell array included in the HDR sensor 14.

The color filter array 13 includes color filters (hereinafter referred to as CFs), the number of which is equal to or more than the number of pixels, each of which separates light of a wavelength corresponding to a predetermined type of color component from the light having passed through the microlens 12 and causes the separated light to enter a corresponding pixel.

The HDR sensor 14 includes the sensor cell array in which each sensor cell (pixel) includes a photodiode and a CMOS element, and outputs a plurality of versions of image data with different lengths of exposure time by controlling the lengths of exposure time using an electronic shutter.

The HDR signal processor 30 performs noise reduction, luminance image data generation, gain distribution generation, tone mapping, combining, color processing, gamma conversion and other processing based on the plurality of versions of image data imaged with different lengths of exposure time by the imaging device 10. The detailed configuration of the HDR signal processor 30 will be described later.

The frame memory 40 stores various image data processed by the HDR signal processor 30 including imaged image data after noise reduction and luminance image data generated by luminance image data generation.

The display apparatus 3 displays an imaged image according to color HDR image data (R_HDR image data, G_HDR image data, B_HDR image data) generated by the HDR signal processor 30.

Next, the configuration of the color filter array 13 is described with reference to FIG. 2.

FIG. 2 shows a configuration of the color filter array 13.

In FIG. 2, R, G and B correspond to CFs that selectively transmit light of a wavelength range of one color of the three primary colors of light (Red, Green and Blue). The numerical subscripts attached to R, G and B indicate row numbers and column numbers. For example, $R_{00}$ refers to a filter that transmits light of a wavelength range of R corresponding to a pixel in the first row and first column. Note that, in this embodiment, the row direction is referred to as the horizontal direction, and the column direction is referred to as the vertical direction. Then, the imaging apparatus 2 performs processing line by line, each line including a plurality of pixels arranged in the horizontal direction.

Specifically, the CF array 13 includes a plurality of CFs, each of which separates, from light passing through the microlens 12, light of a wavelength range of a predetermined one color of light of a wavelength range of red (hereinafter referred to as R-light), light of a wavelength range of green (hereinafter referred to as G-light) and light of a wavelength range of blue (hereinafter referred to as B-light), and causes the separated light to enter a corresponding pixel.

More specifically, as shown in FIG. 2, the CF array includes a plurality of filter lines RGFLs, each of which includes a plurality of R-light transmission filters (Rs in FIG. 2) each separating R-light from incident light and causing the separated R-light to enter a pixel, and a plurality of G-light transmission filters (Gs in FIG. 2) each separating G-light from incident light and causing the separated G-light to enter a pixel, the Rs and Gs being arranged continuously in the order such as R, G, R, G, R, G, . . . , in the horizontal direction.

In addition, the CF array 13 includes a plurality of filter lines GBFLs, each of which includes a plurality of G-light transmission filters, and a plurality of B-light transmission filters (Bs in FIG. 2) each separating B-light from incident light and causing the separated B-light to enter a pixel, the Gs and Bs being arranged continuously in the order such as G, B, G, B, G, B, . . . , in the horizontal direction. The plurality of filter lines RGFLs and GBFLs are arranged continuously in the order such as RGFL, GBFL, RGFL, GBFL, RGFL, . . . , in the vertical direction, as shown in FIG. 2. That is, the plurality of G-light transmission filters, the plurality of B-light transmission filters and the plurality of B-light transmission filters are arranged in Bayer pattern.

Figure 3:
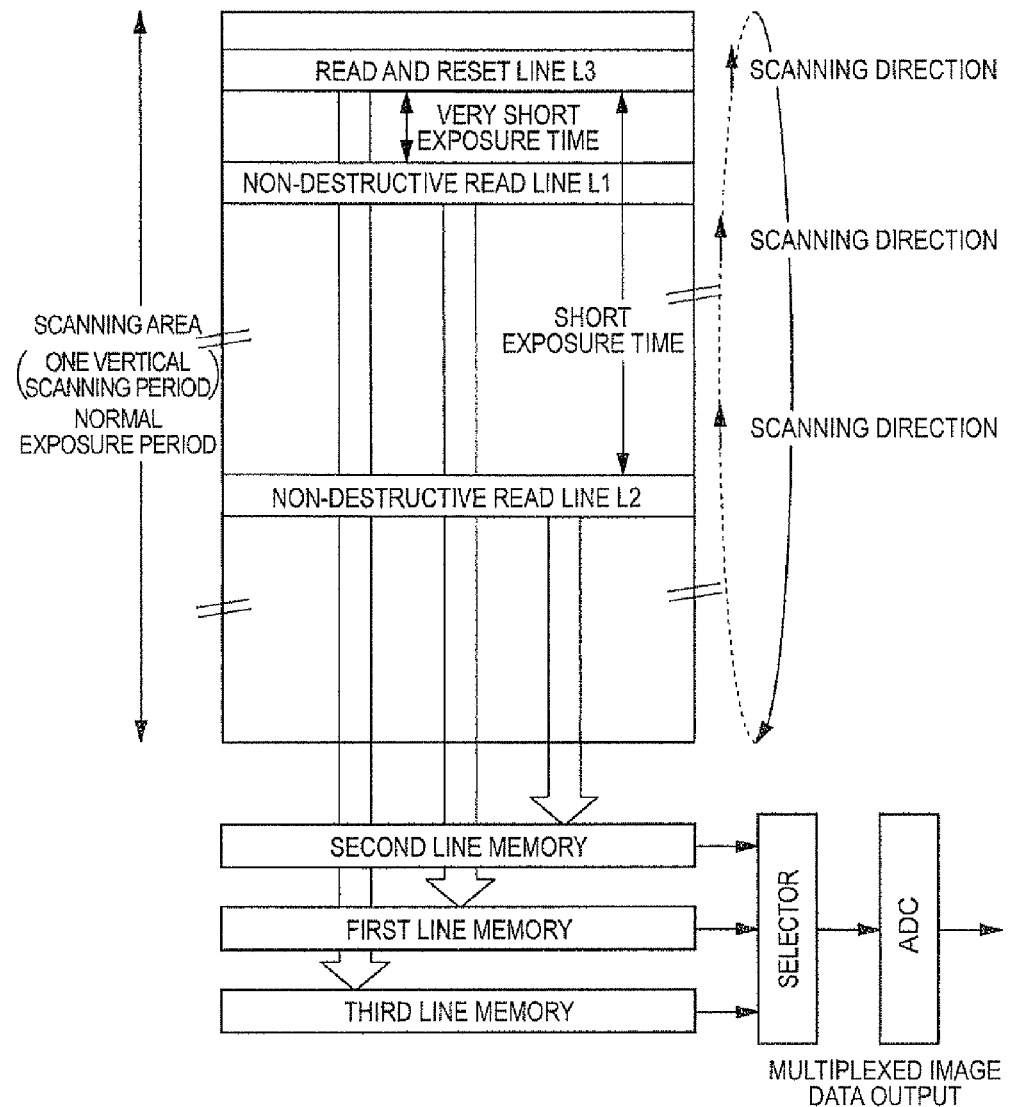
[FIG. 3] It shows an example of exposing pixels and reading pixel signals from the pixels in each line in a sensor cell array of a HDR sensor 14.
Figure 4:
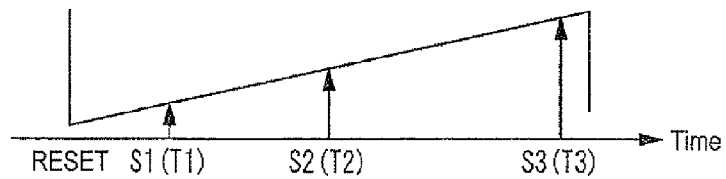
[FIG. 4] It shows an example of the timing of resetting charge accumulation and the timing of reading pixel signals with different exposure times.

Next, a method for controlling the exposure time of the HDR sensor 14 of the imaging device 10 and a method for reading pixel signals from the sensor cell array are described with reference to FIGS. 3 and 4. FIG. 3 shows an example of exposing the pixels and reading pixel signals from the pixels in each line in the sensor cell array of the HDR sensor 14. FIG. 4 shows an example of the timing of resetting charge accumulation and the timing of reading pixel signals with different exposure times.

In the exposure time control method in accordance with the invention, a non-destructive read line L1 for non-destructively reading pixel signals with a very short exposure time T1 and a non-destructive read line L2 for non-destructively reading pixel signals with a short exposure time T2 are set for a exposure area (scanning area) of the sensor cell array. In addition, a read and reset line L3 for resetting charge accumulation of each line of pixels and reading pixel signals with a normal exposure time T3 is set. The relation among T1, T2 and T3 is expressed as "T1<T2<T3" as shown in FIG. 4. That is, when T1 elapses after the reset, the non-destructive read line L1 is set. Then, when T2 elapses after the reset, the non-destructive read line L2 is set. And then, when T3 elapses after the reset, the read and reset line L3 is set.

Specifically, the non-destructive read lines L1 and L2 and the read and reset line L3 are set as follows, as shown in FIG. 3. When charge corresponding to the normal exposure time T3 is accumulated sequentially in each line of pixels in the exposure area, the read and reset line L3 is set to sequentially read pixel signals from the pixels in each line and sequentially reset the charge accumulation in that line. On the other hand, in each line of pixels after the reset of the exposure area, in the period during which the charge corresponding to the normal exposure time T3 is being accumulated, the non-destructive read lines L1 and L2 are set to sequentially and non-destructively read pixel signals from the pixels in each line when the very short exposure time T1 and the short exposure time T2 elapse, respectively.

Note that, in this embodiment, as shown in FIG. 3, pixel signals (analog data) S1 corresponding to the very short exposure time T1 shortly after the reset are read out to a first line memory, and pixel signals (analog data) S2 corresponding to the short exposure time T2 are read out to a second line memory. In addition, pixel signals (analog data) S3 corresponding to the normal exposure time T3 are read out to a third line memory. Then, as shown in FIG. 3, the read pixel signals S1 to S3 are sequentially output in the order of S1, S2, S3 from a selector to an ADC and are converted to digital data (pixel data) by the ADC. Each converted pixel data is output to the HDR signal processor 30 of the imaging control apparatus 20 line by line in the same order as the conversion order (S1, S2, S3).

The timing of reading pixel signals in the non-destructive read lines L1 and L2 and the read and reset line L3 is controlled as follows, as shown in FIG. 3. The read and reset line L3 is sequentially scanned for each line of pixels (in the scanning direction shown in FIG. 3). In the read and reset line L3, charge accumulation is reset, and, immediately before the reset of charge accumulation, pixel signals are read from the pixels having been exposed for the normal exposure time T3. Also, pixel signals with the very short exposure time T1 are read out immediately after the reset.

As an example, the pixel signals S3 corresponding to the normal exposure time T3 are read and the reset is performed in a first line, which is the first line of the exposure area. After this, each time all of the pixel signals S3 are read out to the outside from the third line memory, the scanning of the read and reset line L3 is sequentially performed line by line in the scanning direction shown in FIG. 3. The scanning is performed such that, when the read and reset line L3 returns to the first line, just the normal exposure time T3 elapses. Through these steps, the reading of pixel signals with the normal exposure time and the reset of charge accumulation are sequentially performed for each line of pixels of the exposure area of the sensor cell array.

On the other hand, for the line of pixels in which charge accumulation has been reset, pixel signals S1 are non-destructively read from the pixels having been exposed for the very short exposure time T1 when the non-destructive read line L1 is set, and then, pixel signals S2 are non-destructively read from the pixels having been exposed for the short exposure time T2 when the non-destructive read line L2 is set. Through these steps, the non-destructive reading of the pixel signals S1 with the very short exposure time T1 and the pixel signals S2 with the short exposure time T2 is sequentially performed for each line of pixels of the sensor cell array.

Next, the configuration of the HDR signal processor 30 and the frame memory 40 is described with reference to FIGS. 5 to 7.

Figure 5:
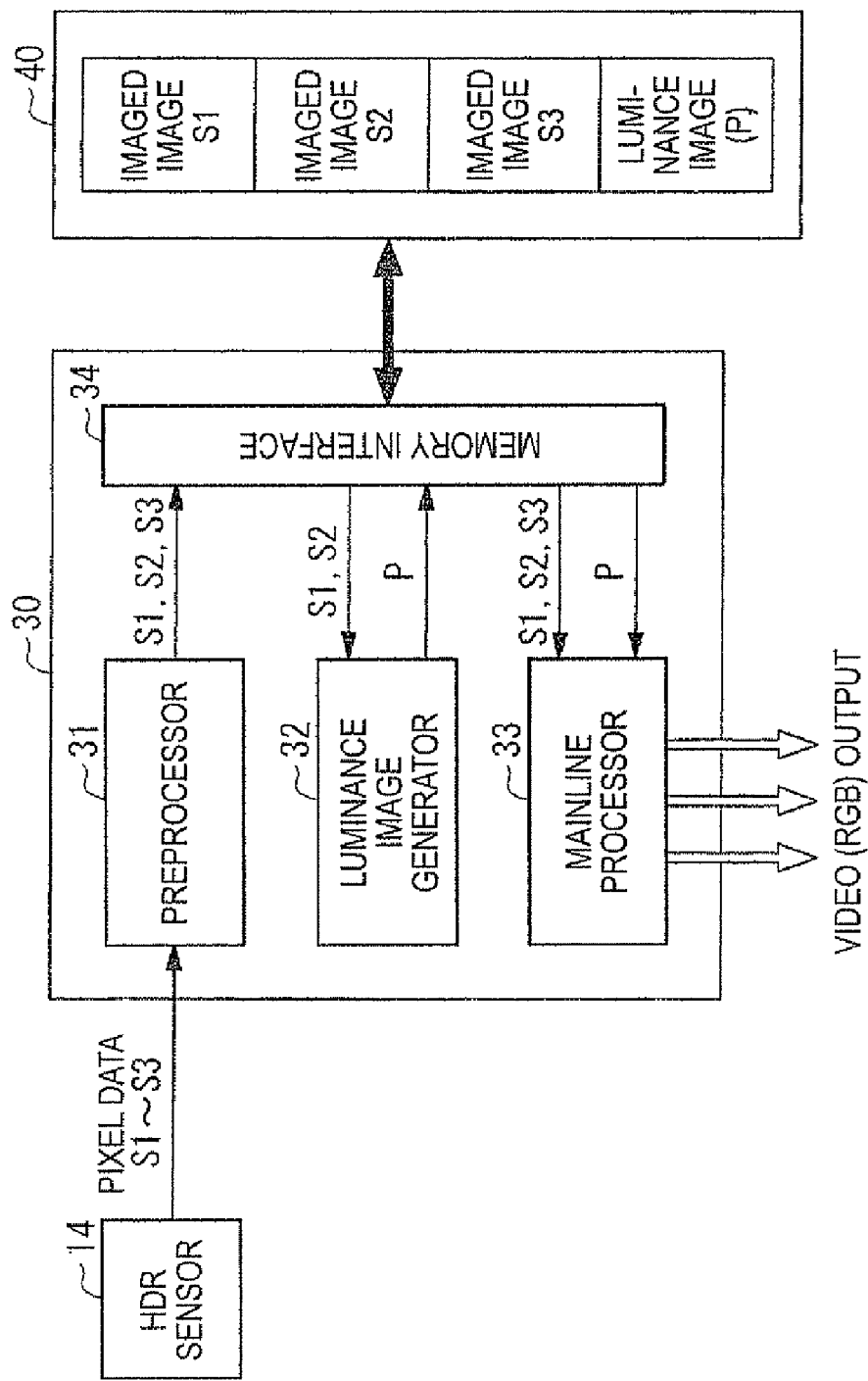
[FIG. 5] It is a block diagram showing a detailed configuration of an imaging control apparatus 20 in accordance with a first embodiment.

FIG. 5 is a block diagram showing a detailed configuration of the imaging control apparatus 20.

As shown in FIG. 5, the HDR signal processor 30 includes a preprocessor 31, a luminance image generator 32, a mainline processor 33 and a memory interface (hereinafter referred to as memory IF) 34.

The preprocessor 31 performs fixed pattern noise reduction, clamping and other processing on the pixel signals (pixel data S1 to S3) from the HDR sensor 14 using the pixel data S1 with the very short exposure time T1.

Specifically, fixed pattern noise reduction is to subtract pixel data with the very short exposure time T1 from pixel data with the short exposure time T2 and from pixel data with the normal exposure time T3 for each corresponding pixel. Since pixel data with the very short exposure time T1 corresponds to pixel signals immediately after the reset, in which only small amount of charge is accumulated and fixed pattern noise component is dominant, subtracting this data from data with the other exposure time can eliminate only the fixed pattern noise component.

Clamping is to receive the pixel data S1 to S3 from the HDR sensor 14, detect whether or not the received pixel data correspond to signals in the light shielding region, and, if determined to correspond to signals in the light shielding region, clamp DC component of all input pixel data so that the signal level of the received pixel data will be the black (reference) level.

Then, the pixel data S1 to S3 having passed through fixed pattern noise reduction and clamping process are stored in the frame memory 40 through the memory IF 34 in the order corresponding to the order in which pixels are arranged in the sensor cell array. Imaged image data (one frame of pixel data) corresponding to the exposure times T1 to T3 are hereinafter referred to as imaged image data S1 to S3, respectively, as with pixel data.

The luminance image generator 32 reads the pixel data S1 and S2 from the frame memory 40 through the memory IF 34, and generates luminance image data P for tone mapping from the read pixel data S1 and S2.

The mainline processor 33 reads the imaged image data S1 to S3 from the frame memory 40 through the memory IF 34, reads the luminance image data P, and performs HDR combining, tone mapping, color processing and gamma conversion based on the read image data. Then, the mainline processor 33 outputs the gamma converted image data as LDR image data to the display apparatus 3.

The memory IF 34 coordinates the writing/reading of data to/from the frame memory 40. Specifically, the memory IF 34 performs the coordination so that the reading/writing can be properly performed in response to requests for reading/writing data from the preprocessor 31, luminance image generator 32 and mainline processor 33. Then, the memory IF 34 performs the reading of data from the frame memory 40 and the writing of data to the frame memory 40 according to the requests from the components.

Next, the detailed configuration of the luminance image generator 32 is described with reference to FIG. 6.

Figure 6:
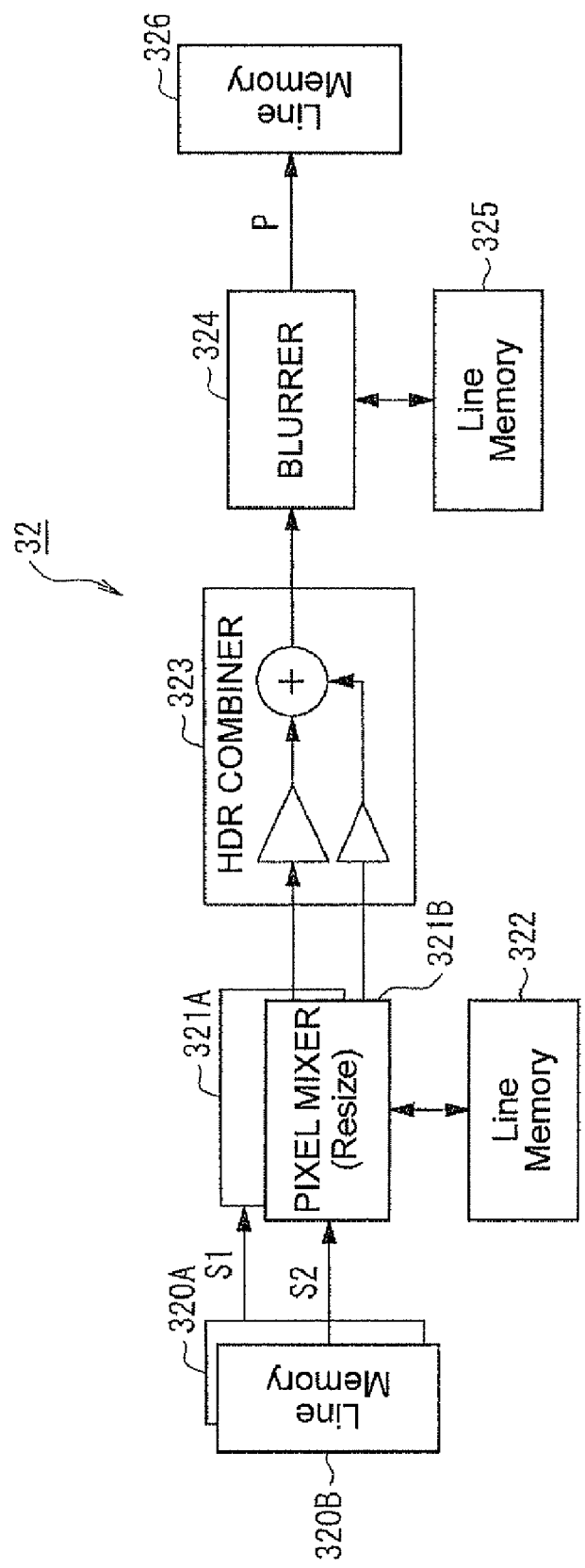
[FIG. 6] It is a block diagram showing a detailed configuration of a luminance image generator 32.

FIG. 6 is a block diagram showing a detailed configuration of the luminance image generator 32.

The luminance image generator 32 includes Line Memories (hereinafter referred to as LMs) 320A and 320B, pixel mixers 321A and 321B, an LM 322, an HDR combiner 323, a blurrer 324, an LM 325 and an LM 326.

The LM 320A stores the pixel data S1 with the very short exposure time T1 read from the frame memory 40 through the memory IF 34 at least two lines by two lines.

The LM 320B stores the pixel data S2 with the short exposure time T2 read from the frame memory 40 through the memory IF 34 at least two lines by two lines.

The pixel mixer 321A mixes the luminance values of four pixels in the pixel data S1 stored in the LM 320A, each of the four pixels corresponding to one of two-rows-by-two-columns of CFs (R, G, G, B) partitioned in the color filter array 13. The pixel data with the mixed luminance value of the four pixels is resized to a quarter of its size. The resized pixel data S1 is hereinafter referred to as pixel data CS1.

The pixel mixer 321B mixes the luminance values of four pixels in the pixel data S2 stored in the LM 320B, each of the four pixels corresponding to one of four CFs (R, G, G, B) partitioned in the color filter array 13. The resized pixel data S2 is hereinafter referred to as pixel data CS2.

The LM 322 is a memory which stores the pixel data CS1 and CS2 mixed by the pixel mixers 321A and 321B.

The HDR combiner 323 performs normalization on the pixel data CS1 mixed by the pixel mixer 321A and the pixel data CS2 mixed by the pixel mixer 321B based on a gain depending on the ratio of the exposure times T1 and T2. Further, the HDR combiner 323 performs weighting on the normalized data and adds the weighted pixel data CS1 and CS2 to generate HDR pixel data for luminance image data generation (Y_RAW_HDR pixel data). Note that one frame of the Y_RAW_HDR pixel data is Y_RAW_HDR image data.

The blurrer 324 performs blurring using a low-pass filter (hereinafter referred to as LPF) on the Y_RAW_HDR pixel data generated by the HDR combiner 323 to generate the luminance image data P. The purpose of performing this blurring is to separate illumination light component from the Y_RAW_HDR image data to obtain a luminance image of the separated illumination light component. The purpose of obtaining the luminance image is to calculate a gain for each pixel, and what is needed is only estimating the luminance values for each pixel or for each area. So, in this embodiment, the luminance image is generated from the pixel data CS1, and CS2 that were resized to a quarter of their sizes.

The LM 325 is a memory which stores some of the Y_RAW_HDR pixel data needed for blurring. For example, when the size of the LPF is 5 by 5, the LM 325 stores 5 lines of the Y_RAW_HDR pixel data.

The LM 326 is a memory which stores the blurred luminance image data P. When the LM 326 is full, the luminance image generator 32 stores the stored luminance image data P in the frame memory 40 through the memory IF 34.

Next, the detailed configuration of the mainline processor 33 is described with reference to FIG. 7.

Figure 7:
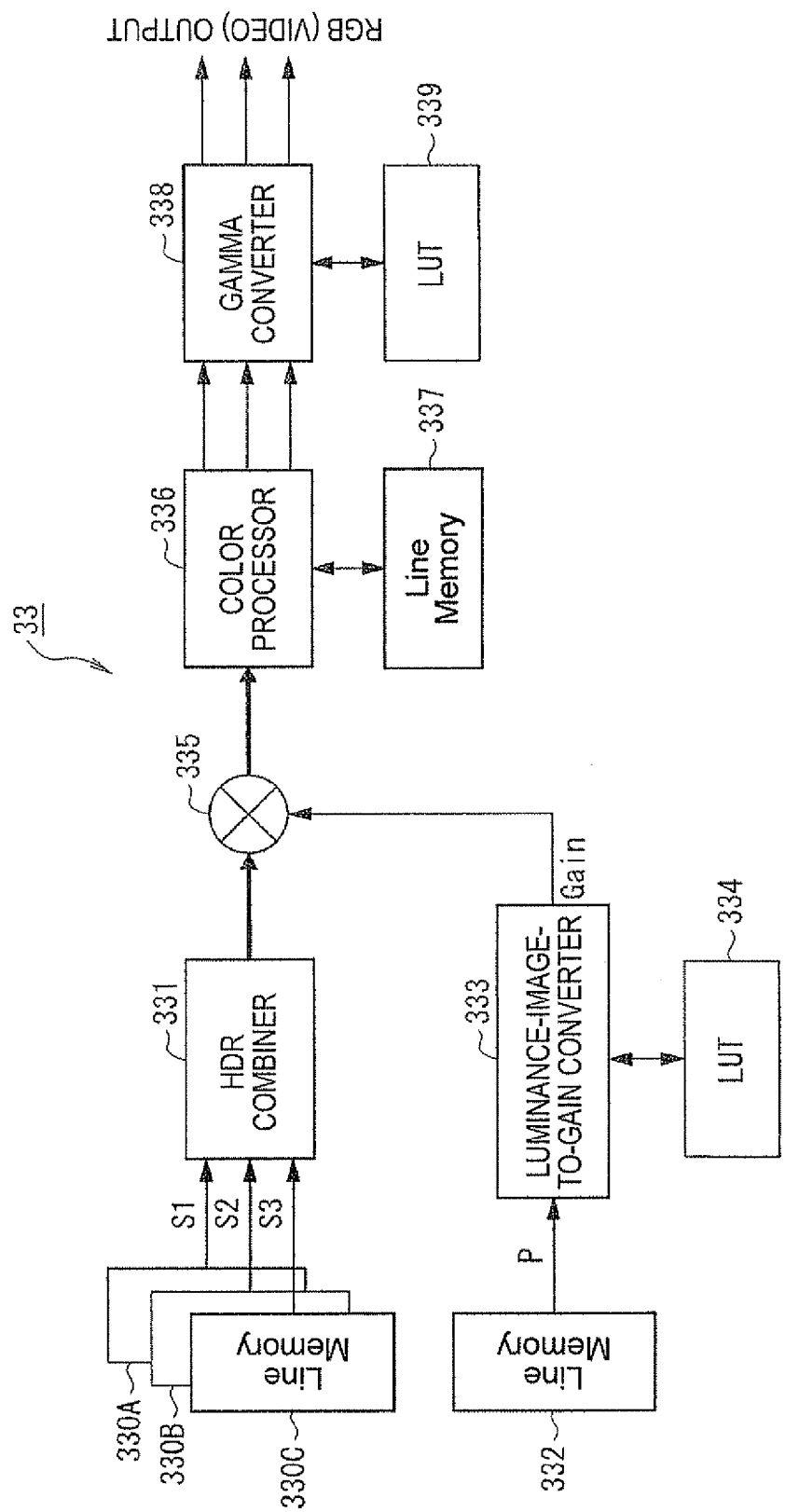
[FIG. 7] It is a block diagram showing a detailed configuration of a mainline processor 33.

FIG. 7 is a block diagram showing a detailed configuration of the mainline processor 33.

As shown in FIG. 7, the mainline processor 33 includes LMs 330A to 330C, an HDR combiner 331, an LM 332, a luminance-image-to-gain converter 333, a Lookup Table (LUT) 334 and a multiplier for tone mapping 335.

Further, the mainline processor 33 includes a color processor 336, a LM 337, a gamma converter 338 and an LUT 339.

The LM 330A is a memory which stores the pixel data S1 with the very short exposure time T1 read from the frame memory 40 through the memory IF 34 line by line.

The LM 330B is a memory which stores the pixel data S2 with the short exposure time T2 read from the frame memory 40 through the memory IF 34 line by line.

The LM 330C is a memory which stores the pixel data S3 with the normal exposure time T3 read from the frame memory 40 through the memory IF 34 line by line.

For the pixel data S1 to S3 stored in the LMs 330A to 330C, the HDR combiner 331 determines a gain depending on the ratio of the exposure times T1 and T3 and a gain depending on the ratio of the exposure times T2 and T3, and normalizes the pixel data S1 and S2 based on the determined gains. Further, the HDR combiner 331 performs weighting on the normalized pixel data S1 and S2 and the pixel data S3. Further, the HDR combiner 331 combines the weighted pixel data S1 to S3 to generate HDR pixel data (HDR_RAW pixel data). For example, when each of the pixel data S1 to S3 is 10-bit data, the HDR combiner 331 generates 16-bit HDR pixel data. Note that one frame of HDR pixel data is HDR image data (HDR_RAW image data).

The LM 332 is a memory which stores a plurality of luminance pixel data included in the luminance image data P, read from the frame memory 40 through the memory IF 34 line by line.

In response to the input of the luminance pixel data stored in the LM 332, the luminance-image-to-gain converter 333 reads from the LUT 334 a gain corresponding to a luminance value of the luminance pixel data and outputs the read gain to the multiplier for tone mapping 335.

The LUT 334 is a data table storing a gain K(P) for each luminance value P, previously calculated according to the following formula (1). In this embodiment, the LUT 334 stores the gain K(P) for broadening the histogram of the luminance of HDR image data.

$$K(P) = 1/P_L^i \quad (1)$$

where the exponent i is a positive real number less than or equal to 1, and $P_L$ is a luminance value normalized in the range of 0 to 1.

The multiplier for tone mapping 335 performs tone mapping by multiplying each HDR pixel data included in HDR image data generated by the HDR combiner 331 by the corresponding gain output from the luminance-image-to-gain converter 333. That is, the relationship expressed by the following formula (2) holds:

$$Y' K(P) \times Y \quad (2)$$

where Y is the value indicating each pixel data of HDR image data, and Y' is the value indicating the result of tone mapping.

In this embodiment, since gain distribution is generated for the luminance image data P resized to a quarter of its size, the luminance-image-to-gain converter 333 generates a gain for each area of four pixels. Accordingly, the multiplier for tone mapping 335 multiplies each HDR pixel data of HDR image data for each four pixels partitioned in the color filter array 13 by one gain output from the luminance-image-to-gain converter 333.

HDR pixel data tone-mapped by the multiplier for tone mapping 335 is output to the color processor 336.

The color processor 336 performs color interpolation processing using HDR pixel data of a pixel to be processed stored in the LM 337 and HDR pixel data of pixels around the pixel to be processed stored in the LM 337. That is, for each point of the image, processing of generating color signals (data) defined in the RGB color space (color signal processing) is performed using HDR pixel data delayed by the LM 337.

Specifically, the color processor 336 converts HDR pixel data to color HDR pixel data each corresponding to each color element of RGB for each pixel using color interpolation processing.

This generates color HDR pixel data including R_HDR pixel data corresponding to R color element, G_HDR pixel data corresponding to G color element and B_HDR pixel data corresponding to B color element for each pixel. Note that color HDR image data includes color HDR pixel data corresponding to one frame of pixel data S1 to S3.

The LM 337 is a memory which stores tone-mapped pixel data needed for color processing line by line.

Note that the luminance image data P having passed through the LPF included in each local area of the image have approximately the same value, so their gains K are approximately the same value. Accordingly, the gains of red, green and blue pixels included in the imaging device are locally the same value, which maintains the balance among the colors of red, green and blue.

Note that the order of the multiplier for tone mapping 335 and the color processor 336 may be reversed. When reversed, color processing is performed on HDR-combined HDR_RAW pixel data to generate R_HDR, G_HDR and B_HDR pixel data, then multiplication for tone mapping is performed on the R_HDR, G_HDR and B_HDR pixel data. In this case, multiplication needs to be performed three times.

The LUT 339 stores information on a tone curve for the displayable tonal range of the display apparatus 3. From the LUT 339, the gamma converter 338 retrieves a conversion value corresponding to a luminance value of each pixel data on which color processing has been performed by the color processor 336. Then, the gamma converter 338 performs gamma conversion by replacing the luminance value of each pixel data with the corresponding conversion value on the tone curve.

For example, when the tonal range of color HDR pixel data is 20-bit and the displayable tonal range of the display apparatus 3 is 8-bit, the gamma converter 338 retrieves conversion values corresponding to input luminance values from information stored in the LUT 339 on a tone curve that converts luminance values of 20-bit tonal range to those of 8-bit tonal range. At this time, information on displayable tonal range may be obtained from the display apparatus 3.

In this way, the gamma converter 338 gamma converts color HDR image data the histogram of which is broadened through tone mapping, and converts 20-bit tonal range HDR image data to 8-bit tonal range color LDR image data.

The LUT 339 is, at least, a data table that stores information on a tone curve for the displayable tonal range of the display apparatus 3.

Next, the operation of this embodiment is described with reference to FIGS. 8 to 10.

Figure 8:
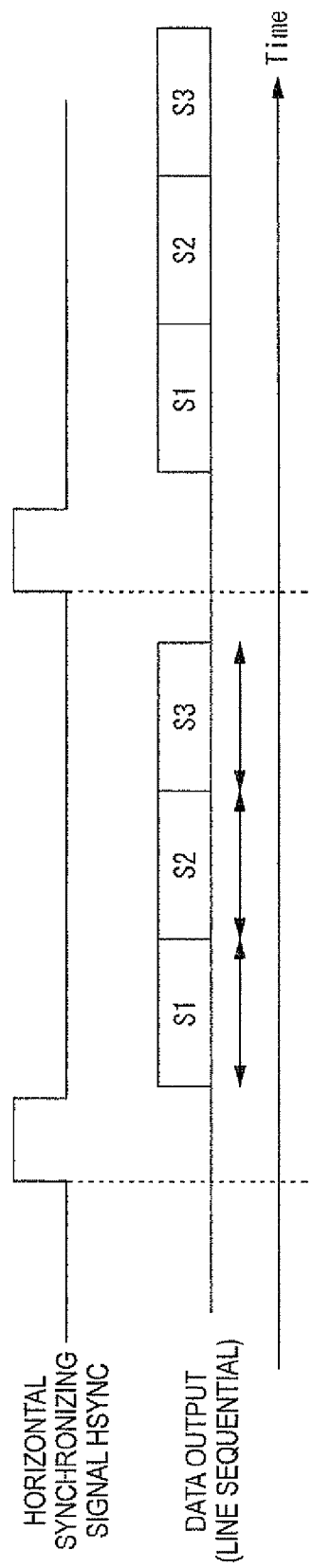
[FIG. 8] It shows an example of how pixel data is output from the HDR sensor 14.

FIG. 8 shows an example of how pixel data is output from the HDR sensor 14. FIG. 9 shows an example of output timing of pixel data for each frame. FIG. 10(a) shows an example of a histogram of HDR image data. FIG. 10(b) shows an example of a histogram broadened through tone mapping.

When imaging of an object is started, light reflected by the object is focused by the lens 11 and enters the microlens 12. Incident light from the lens 11 is collimated by the microlens 12 and enters each pixel of the sensor cell array through CFs of the color filter array 13. In the color filter array 13, the CFs each corresponding to one of the three primary colors (RGB) are arranged in Bayer pattern. So, only one color element light of R-, G- and B-lights, corresponding to each CF, enters each pixel.

On the other hand, when imaging is started, the read and reset line L3 is set line by line sequentially from the starting line, then the pixel signals S3 are read from pixels in the scanned lines, and then charge accumulated in the pixels are reset. Note that the pixel signals S3 read at the first time are ignored in the subsequent stages because they have not been exposed with the normal exposure time T3. Then, on each scanning line, the non-destructive read line L1 is set when the very short exposure time T1 elapses after the reset of the pixels, and the pixel signals S1 are read. Then, on each scanning line, the non-destructive read line L2 is set when the short exposure time T2 elapses after the reset of the pixels, and the pixel signals S2 are read. And again, the read and reset line L3 is set sequentially from the starting line, then the pixel signals S3 are read from pixels in the scanned lines, and then charges accumulated in the pixels are reset. The pixel signals S3 read at this time and the pixel signals S1 and S2 previously read are to be processed in the subsequent stages.

Also, after this, while imaging is being performed, the setting of the lines L1 to L3, the reading of the pixel signals S1 to S3, and the reset, as described above, are repeatedly performed.

The pixel signals S1 to S3 thus read are stored in the first to third line memories line by line and output to the selector line by line. Then, the analog pixel data S1 to S3 are output from the selector to the ADC in the order of S1, S2, S3. The ADC converts the analog pixel data S1 to S3 to the digital pixel data S1 to S3. Then, as shown in FIG. 8, the ADC sequentially outputs the pixel data to the HDR signal processor 30 line by line in the order of S1, S2, S3. Then, as shown in FIG. 9, the HDR signal processor 30 sequentially receives the pixel data S1 and S2 before receiving the pixel data S3.

On the other hand, when HDR signal processor 30 receives the pixel data S1 to S3 from the HDR sensor 14 in the order of S1, S2, S3, the preprocessor 31 performs fixed pattern noise reduction and clamping on the pixel data in the receiving order. Then, the processed pixel data are stored in the frame memory 40 through the memory IF 34 in the order of S1, S2, S3.

When the pixel data S1 and S2 are stored in the frame memory 40, the luminance image generator 32 reads the stored pixel data S1 and S2 through the memory IF 34. Then, the read pixel data S1 and S2 are stored in the LMs 320A and 320B, respectively. When one line of the pixel data S1 and S2 are stored in the LMs 320A and 320B, the luminance image generator 32 outputs the stored pixel data S1 and S2 to the pixel mixers 321A and 321B. The pixel mixers 321A and 321E store the input pixel data S1 and S2 to the LM 322. When two lines of the pixel data S1 and S2 to be processed are stored in the LM 322, the pixel mixer 321A performs the pixel mixing of the pixel data S1, and the pixel mixer 321B performs the pixel mixing of the pixel data S2. Specifically, for each four pixels (two rows by two columns) partitioned and arranged in Bayer pattern, pixel data of four color elements (R, G, G, B) corresponding to these four pixels are mixed.

Taking four pixels of $R_{00}$, $G_{01}$, $G_{10}$ and $B_{11}$ shown in FIG. 2 as an example, the mixing of pixel data is performed as follows: $CS=R_{00}+G_{01}+G_{10}+B_{11}$, where CS is the luminance value of the mixed pixel data. Thus, the luminance value representing each area of four pixels is determined by adding luminance values of the pixel data of two G-lights and luminance values of the pixel data of R- and B-lights.

This converts the pixel data S1 and S2 of the imaged image data S1 and S2 from data of four pixels to data of one pixel, resizing each imaged image to a quarter of its size. The pixel mixers 321A and 321B outputs the pixel data CS1 and CS2 after pixel mixing to the HDR combiner 323.

When the pixel data CS1 and CS2 are input, the HDR combiner 323, first, normalizes the pixel data CS1 based on a gain depending on the ratio of the exposure times T1 and T2. Next, the HDR combiner 323 performs weighting on the normalized pixel data CS1 and the pixel data CS2. Next, the HDR combiner 323 generates HDR pixel data for luminance image data generation (Y_RAW_HDR pixel data) by adding the weighted pixel data CS1 and CS2.

The HDR combiner 323 outputs the generated Y_RAW_HDR pixel data to the blurrer 324.

When the Y_RAW_HDR pixel data is input from the HDR combiner 323, the blurrer 324 stores the Y_RAW_HDR pixel data in the LM 325. When the LM 325 stores some of the Y_RAW_HDR pixel data needed for blurring, the blurrer 324 reads the stored Y_RAW_HDR pixel data and performs filtering on the read data using the LPF. This filtering may be simple averaging or weighting for each pixel data.

When blurring is performed on Y_RAW_HDR pixel data in this way, luminance pixel data for the Y_RAW_HDR pixel data is generated. That is, pixel data is generated in which reflectance component is reduced and illumination light component is dominant. The blurrer 324 stores the generated luminance pixel data in the LM 326. When the LM 326 is full, the luminance image generator 32 stores the stored luminance pixel data in the frame memory 40 through the memory IF 34. Note that the luminance image data P includes luminance pixel data for one frame of the pixel data S1 and S2.

On the other hand, when luminance pixel data is stored in the frame memory 40, the mainline processor 33 reads the luminance pixel data from the frame memory 40 through the memory IF 34 and stores the luminance pixel data in the LM 332. When the luminance pixel data is stored in the LM 332, the luminance-image-to-gain converter 333 sequentially reads the stored luminance pixel data, retrieves from the LUT 334 a gain corresponding to a luminance value of the read luminance pixel data, and outputs the retrieved gain to the multiplier for tone mapping 335.

Also, when the pixel data S3 is stored in the frame memory 40, the mainline processor 33 reads the pixel data S1 to S3 from the frame memory 40 through the memory IF 34, and stores the read pixel data S1, S2 and S3 to the LMs 330A, 330B and 330C, respectively.

When the pixel data S1 to S3 are stored in the LMs 330A to 330C, the HDR combiner 331, first, determines a gain G11 depending on the ratio of the exposure times T1 and T3 and a gain G12 depending on the ratio of the exposure times T2 and T3. Next, the HDR combiner 331 normalizes the pixel data S1 and S2 by reading the pixel data S1 to S3 from the LMs 330A to 330C, multiplying the read pixel data S1 by the gain G11, and multiplying the read pixel data S2 by the gain G12.

Next, the HDR combiner 331 performs weighting on the normalized pixel data S1 and S2 and the pixel data S3. Then, the HDR combiner 331 combines the weighted pixel data S1 to S3 to generate HDR pixel data (HDR_RAW pixel data). The generated HDR_RAW pixel data is output to the multiplier for tone mapping 335.

Here, let us assume that a gain K(P) is stored in the LUT 334, the gain K(P) being calculated according to the following formula (3) that is the above formula (2) with i=0.6.

$$K(P)=1/P_L^{0.6} \quad (3)$$

In the above formula (3), $P_L$ is a luminance value within the tonal range of HDR_RAW pixel data, normalized in the range of 0 to 1. For example, when the tonal range of HDR_RAW pixel data is 20-bit, normalization can be done by dividing a luminance value Y ranging "0" (the minimum value) to "20'hFFFFFF (HEX)" (the maximum value) by "$2^{20}$."

According to the characteristic of the gain K(P) calculated according to the above formula (3), the closer to 1 $P_L$ is (the brighter), the less the luminance value is increased, and the closer to 0 $P_L$ (the darker), the more the luminance value is increased (the more brightened).

The multiplier for tone mapping 335 multiplies a luminance value of HDR_RAW pixel data input from the HDR combiner 331 by a gain input from the luminance-image-to-gain converter 333 and outputs the multiplication result to the color processor 336.

Here, in the multiplier for tone mapping 335, the histogram of the luminance of HDR_RAW image data before being multiplied by the gain has, as shown in FIG. 10 (a), a peak indicating many pixels in a dark section where $P_L$ is close to 0 (surrounded by a circle). On the other hand, the histogram of the luminance of HDR_RAW image data multiplied by the gain and tone mapped is, as shown in FIG. 10(b), totally broadened with a dark section being spread over a range surrounded by a circle and a bright section as it is.

The color processor 336 stores HDR_RAW pixel data input from the multiplier for tone mapping 335 in the LM 377 and, when HDR_RAW pixel data needed for processing is stored in the LM 377, reads the stored HDR_RAW pixel data.

Then, the color processor 336 performs color interpolation processing on the read data, and generates color HDR pixel data including R_HDR pixel data corresponding to R color element, G_HDR pixel data corresponding to G color element and B_HDR pixel data corresponding to B color element for each pixel. The generated color HDR pixel data is output to the gamma converter 338.

When color HDR pixel data is input from the color processor 336, the gamma converter 338 reads a conversion value corresponding to a luminance value of each input pixel data from the LUT 339 storing information on a tone curve for the displayable tonal range of the display apparatus 3. Then, the gamma converter 338 performs gamma conversion on color HDR pixel data by using the reads conversion values as gamma converted luminance values. The gamma converted pixel data is color LDR pixel data.

For example, when the displayable tonal range of the display apparatus 3 is 8-bit, 8-bit color LDR image data is generated through gamma conversion. The color LDR image data is output as RGB video output signal to the display apparatus 3.

Note that, as described above, the pixel signals S1 to S3 of each frame are stored in the frame memory 40 in the order of the pixel data S1, S2, S3.

Then, as described above, in the mainline processor 33, the processing of generating HDR image data (mainline processing) is performed using all of the pixel data S1 to S3.

Figure 9:
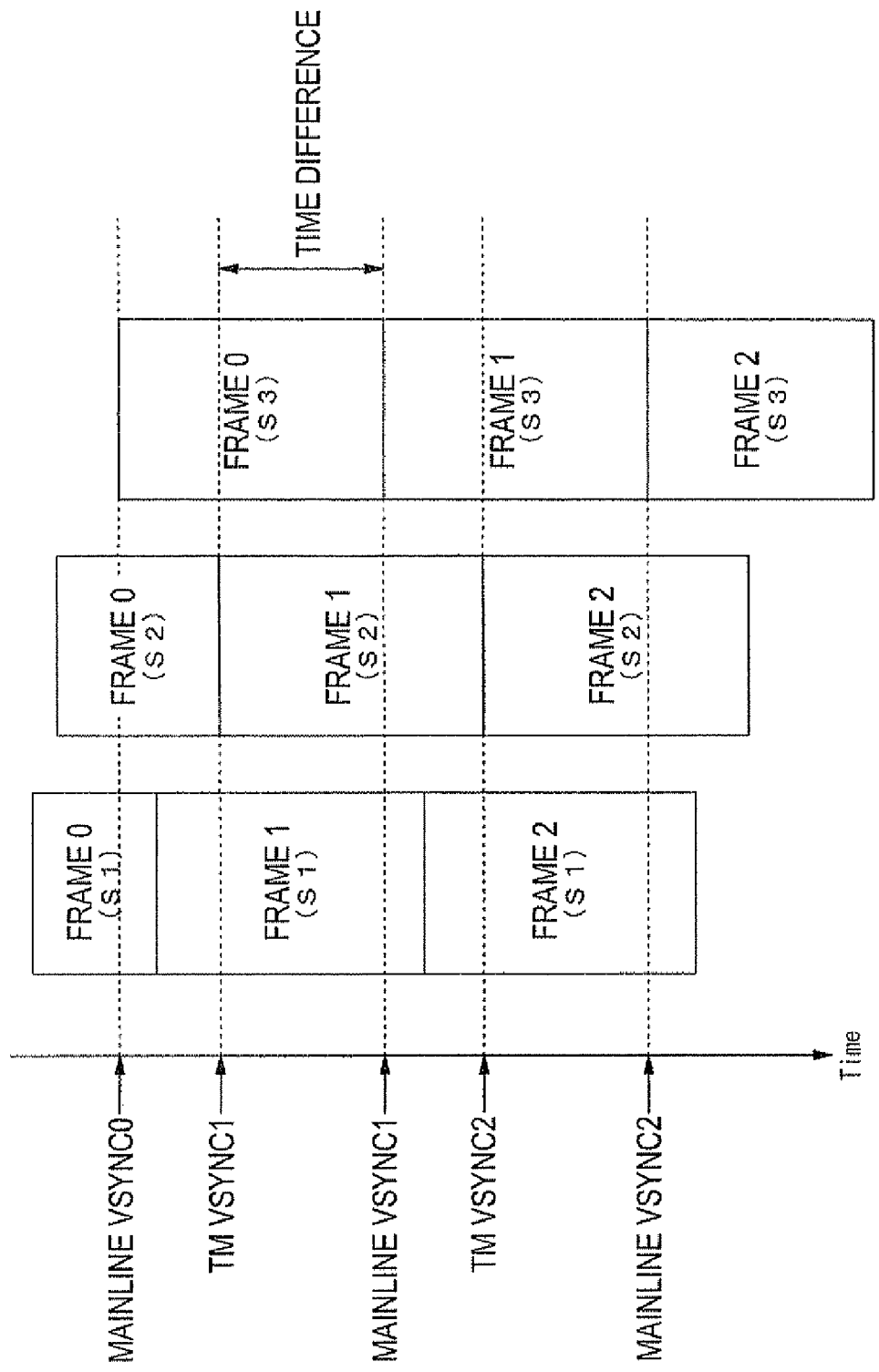
[FIG. 9] It shows an example of output timing of pixel data for each frame.
Figure 10B:
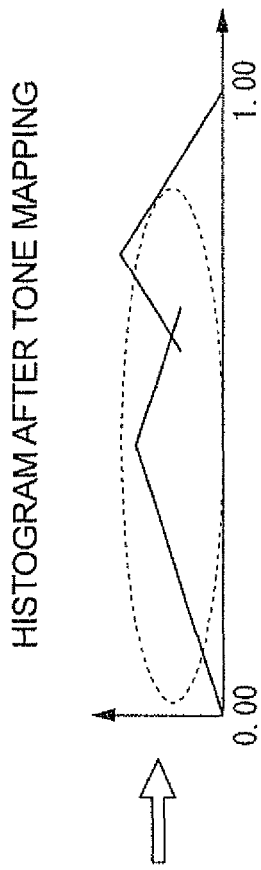
[FIG. 10(b)] It shows an example of a histogram broadened through tone mapping.
Figure 10A:
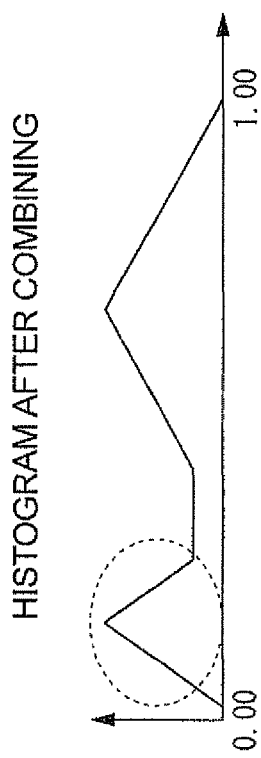
[FIG. 10(a)] It shows an example of a histogram of HDR image data.

Accordingly, in this embodiment, the mainline processing starts when the first pixel data S3 of each frame is stored line by line in the frame memory 40, as indicated by mainline VSYNC0 to VSYNC2 in FIG. 9. In each frame, each time new pixel data S3 is stored, the mainline processing is sequentially performed like pipeline processing.

Also, as described above, in the luminance image generator 32 and the mainline processor 33, the processing of generating the luminance image data P from the pixel data S1 and S2 and determining a gain for tone mapping from the luminance image data P (TM processing) is performed.

Accordingly, in this embodiment, the TM processing starts when the first pixel data S2 of each frame is stored line by line in the frame memory 40, as indicated by TM VSYNC1 and VSYNC2 in FIG. 9. In each frame, each time new pixel data S2 is stored, the TM processing is sequentially performed like pipeline processing.

As a result, in each frame, a time difference as shown in FIG. 9 occurs between the start of the mainline processing and the start of the TM processing. If the TM processing can be completed and the generated luminance image data P can be stored in the frame memory 40 within this time difference, the mainline processing and the TM processing can be synchronized without one of them being delayed. In this embodiment, the TM processing can be completed within this time difference. This means that no delay element for timing adjustment is needed.

As described above, in the imaging apparatus 2 in accordance with this embodiment, the luminance image generator 32 can generate the luminance image data P using the pixel data S1 and S2 with the very short exposure time T1 and the short exposure time T2 obtained before the normal exposure time T3 elapses, and store the generated luminance image data P in the frame memory 40. Then, when the mainline processor 33 obtains the pixel data S3 with the normal exposure time T3 and generates HDR image data from the pixel data S1 to S3, tone mapping can be performed on the generated HDR image data using the luminance image data P stored in the frame memory.

This eliminates the need for a delay element for adjusting the timing between the mainline processing of generating HDR image data and the TM processing of generating the luminance image data P.

Further, the luminance image data P is generated using the pixel data S1 and S2 obtained through non-destructive reading, which allows the hue to be maintained over the whole dynamic range.

Further, tone mapping is performed on HDR image data based on the luminance image data P, which allows the tonality to be maintained and enables to output video with good color reproducibility over the whole dynamic range.

Further, in generating the luminance image data P, the pixel data S1 and S2 are resized, then the resized pixel data are combined to generate HDR image data for luminance image generation, and then filtering is performed on the generated HDR image data using an LPF.

This can reduce filtering load and the luminance image data P can be resized to a quarter of its size, which allows smaller size of line memories and lower cost configuration.

In the first embodiment described above, the preprocessor 31 corresponds to the image data obtaining unit according to any one of Aspects 1, 4 and 9, and the luminance image generator 32, the LM 332, the luminance-image-to-gain converter 333 and the LUT 334 correspond to the gain distribution generation unit according to any one of Aspects 1, 4, 7, 9, 10, 13, 14 and 16.

Also, in the first embodiment described above, the multiplier for tone mapping 335, the color processor 336, the LM 337, the gamma converter 338 and the LUT 339 correspond to the tonal conversion unit according to any one of Aspects 1, 11, 17 and 18.

Also, in the first embodiment described above, the functional part in the multiplier for tone mapping 335 for obtaining HDR_RAW pixel data from the HDR combiner 331 corresponds to the combined image data obtaining unit according to Aspect 1.

Also, in the first embodiment described above, the LMs 330A to 330C and the HDR combiner 331 correspond to the combined image data generation unit according to Aspect 3 or 4.

Also, in the first embodiment described above, the processing of obtaining the pixel data S1 and S2 in the preprocessor 31 corresponds to the image data obtaining step according to Aspect 21, and the processing of generating a gain by the luminance image generator 32, the LM 332, the luminance-image-to-gain converter 333 and the LUT 334 corresponds to the gain distribution generation step according to Aspect 21.

Also, in the first embodiment described above, the processing of generating HDR image data in the LMs 330A to 330C and the HDR combiner 331 corresponds to the combined image data obtaining step according to Aspect 21.

Also, in the first embodiment described above, the processing of converting the tone of HDR image data by the multiplier for tone mapping 335, the color processor 336, the LM 337, the gamma converter 338 and the LUT 339 corresponds to the tonal conversion step according to Aspect 21.

[Second Embodiment]

Figure 11:
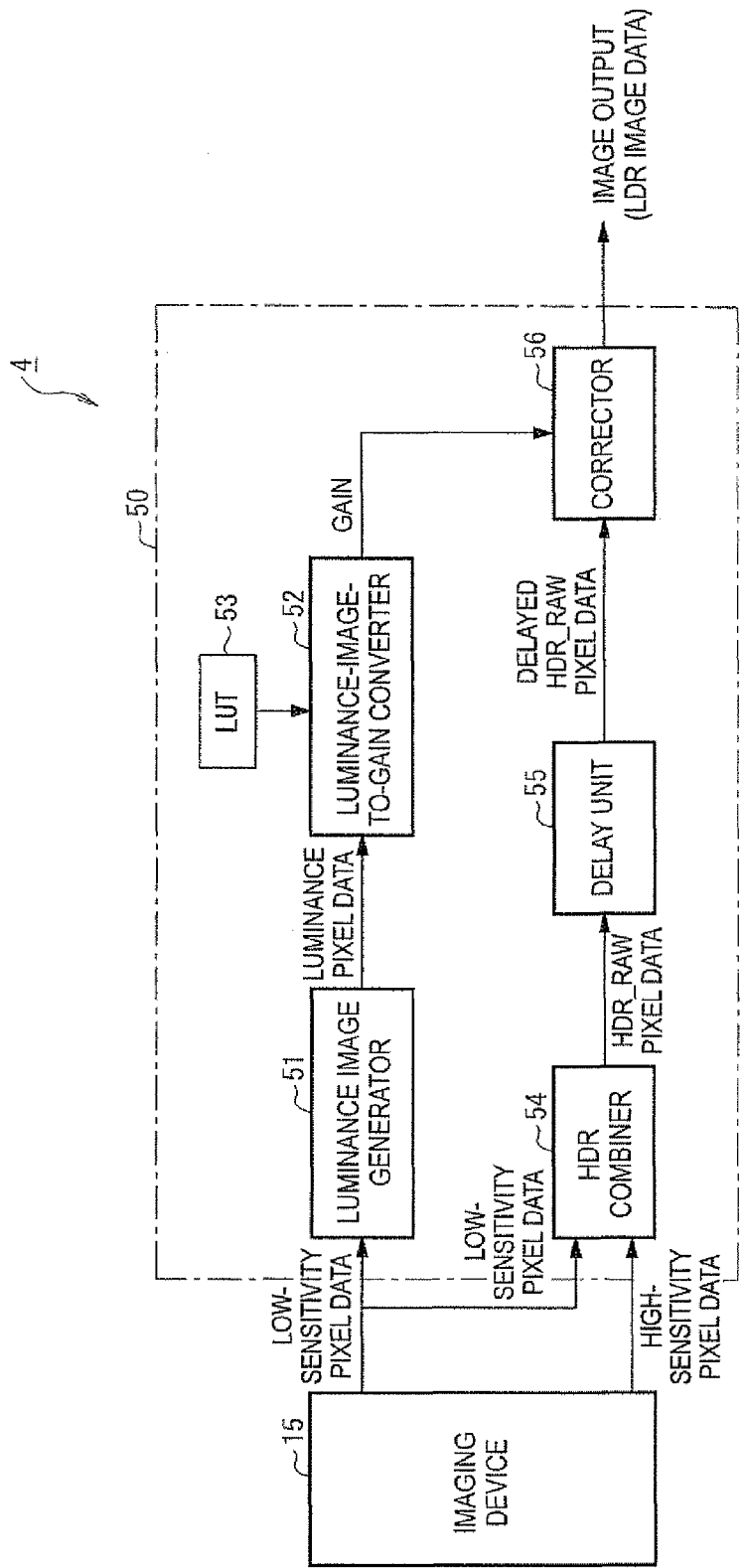
[FIG. 11] It is a block diagram showing a detailed configuration of an imaging control apparatus 50 in accordance with a second embodiment.

Next, a second embodiment of the invention is described with reference to the drawings. FIG. 11 shows an imaging control apparatus, an imaging apparatus and an imaging control method in accordance with the second embodiment of the invention.

This embodiment is different from the first embodiment described above in that the HDR sensor 14 in the imaging device 10 in the first embodiment has a sensor cell array including two pixel groups having different sensitivities and outputs two pixel data SL and SH imaged by different pixels having different sensitivities. Here, let us assume that the sensitivity of a pixel that provides the pixel data SL is lower than that of a pixel that provides the pixel data SH.

Also, the configuration of the imaging control apparatus in accordance with this embodiment is different from that of the imaging control apparatus in accordance with the first embodiment described above in that the mainline processing of generating HDR image data from the pixel data SL and SH is performed, and the TM processing of generating the luminance image data P from the pixel data SL is performed.

First, a configuration of an imaging control apparatus in accordance with the invention is described with reference to FIG. 11. FIG. 11 is a block diagram showing the detailed configuration of an imaging control apparatus 50 in accordance with the invention.

As shown in FIG. 11, an imaging apparatus 4 includes an imaging device 15 and the imaging control apparatus 50.

The imaging device 15 includes the lens 11, the microlens 12 and the color filter array 13 similarly as the imaging device 10 in the first embodiment described above. The imaging device 15 outputs low-sensitivity pixel data SL obtained by imaging an object using a pixel with a relatively low sensitivity and high-sensitivity pixel data SH obtained by imaging the object using a pixel with a relatively high sensitivity at the same time.

Specifically, a sensor cell array includes two pixel groups having different sizes. Then, with the same exposure time, the pixel group having a larger size has a higher sensitivity (receives a larger amount of light), and the pixel group having a smaller size has a lower sensitivity (receives a smaller amount of light).

Also, in this embodiment, the sensor cell array includes a CCD (Charge Coupled Device) unlike the first embodiment described above.

The imaging control apparatus 50 includes a luminance image generator 51, a luminance-image-to-gain converter 52, an LUT 53, an HDR combiner 54, a delay unit and a corrector 56. Note that the imaging control apparatus 50 connects with the display apparatus 3, as the first embodiment described above.

The luminance image generator 51 is configured such that the HDR combiner 323 and related LMs are removed from the luminance image generator 32 in the first embodiment described above, and includes a pixel mixer for mixing pixels for the low-sensitivity pixel data SL.

The luminance image generator 51 further includes a blurrer for performing blurring, similarly to the blurrer 324 in the first embodiment described above, on low-sensitivity pixel data SL' resized through pixel mixing. The blurred pixel data is output as luminance pixel data to the luminance-image-to-gain converter 52.

The luminance-image-to-gain converter 52 retrieves from the LUT 53 a gain corresponding to a luminance value of luminance pixel data input from the luminance image generator 51, and outputs the retrieved gain to the corrector 56. This process is similar to that of the luminance-image-to-gain converter 333 in the first embodiment described above except the generation process of input luminance pixel data.

The LUT 53 stores a data table of a gain K(Y) for a luminance value of luminance pixel data, like the LUT 334 in the first embodiment described above.

The HDR combiner 54 calculates a gain depending on the ratio of sensitivities for the low-sensitivity pixel data SL and the high-sensitivity pixel data SH input from the imaging device 15, and normalizes the low-sensitivity pixel data SL based on the calculated gain. Further, the HDR combiner 54 generates HDR_RAW pixel data by performing weighting on the normalized low-sensitivity pixel data SL and the high-sensitivity pixel data SH and adding the weighted SL and SH. The generated HDR_RAW pixel data is output to the delay unit 55.

The delay unit 55 delays HDR_RAW pixel data input from the HDR combiner 54 by a predetermined time interval to synchronize with the output of the gain from the luminance-image-to-gain converter 52, and outputs the delayed HDR_RAW pixel data to the corrector 56.

The corrector 56 includes the multiplier for tone mapping 335, the color processor 336, the LM 337, the gamma converter 338 and the LUT 339, as with the first embodiment described above.

Accordingly, the multiplier for tone mapping 335 multiplies HDR_RAW pixel data input from the delay unit by a gain input from the luminance-image-to-gain converter 52 to perform tone mapping on HDR_RAW image data. The color processor 336 performs color interpolation processing on the tone-mapped HDR_RAW pixel data and generates color HDR pixel data including R_HDR pixel data, G_HDR pixel data and B_HDR pixel data for each pixel. The gamma converter 338 reads a conversion value corresponding to a luminance value of each input pixel data from the LUT 339 storing information on a tone curve for the displayable tonal range of the display unit 3 connected with the imaging control apparatus 50. Then, the gamma converter 338 performs gamma conversion on color HDR pixel data by replacing the input luminance values with the read conversion values. The gamma converted pixel data is color LDR pixel data. This color LDR pixel data is output as RGB video output signal to the display unit 3.

Next, the actual operation of this embodiment is described.

When imaging of an object is started, light reflected by the object is focused by the lens 11 and enters the microlens 12. Incident light from the lens 11 is collimated by the microlens 12 and enters each pixel of the sensor cell array through CFs of the color filter array 13.

A low-sensitivity pixel group outputs the low-sensitivity pixel data SL obtained by imaging to the imaging control apparatus 50, and a high-sensitivity pixel group outputs the high-sensitivity pixel data SH obtained by imaging to the imaging control apparatus 50. Specifically, the low-sensitivity pixel data SL is output to the imaging control apparatus 50 and the HDR combiner 54, and the high-sensitivity pixel data SH is output to the HDR combiner 54.

On the other hand, when imaging control apparatus 50 receives the pixel data SL and SH from the imaging device 15, the luminance image generator 51 outputs the low-sensitivity pixel data SL to the pixel mixer. The pixel mixer performs pixel mixing on the input low-sensitivity pixel data SL. Specifically, for each four pixels (two rows by two columns) partitioned and arranged in Bayer pattern, pixel data of four color elements (R, G, G, B) corresponding to these four pixels are mixed.

This converts four pixels of data of the low-sensitivity pixel data SL to one pixels of data, resizing the low-sensitivity imaged image data obtained by imaging with low-sensitivity pixels to a quarter of its size. The pixel mixer outputs pixel-mixed low-sensitivity pixel data CSL to the blurrer.

When the low-sensitivity pixel data CSL is input from the pixel mixer, the blurrer performs filtering on the input data using an LPF.

When blurring is performed on the low-sensitivity pixel data CSL in this way, luminance pixel data for the low-sensitivity pixel data CSL is generated. The blurrer outputs the generated luminance pixel data to the luminance-image-to-gain converter 52.

The luminance-image-to-gain converter 52 retrieves from the LUT 53 a gain corresponding to a luminance values of the input luminance pixel data, and outputs the retrieved gain to a multiplier for tone mapping of the corrector 56. Here, the LUT 53 stores a gain K(Y) calculated according to the above formula (3).

On the other hand, in parallel with the processing of generating luminance pixel data and converting the generated luminance pixel data into gains, the HDR combiner 54 performs processing of generating HDR_RAW pixel data from the input low-sensitivity pixel data SL and the high-sensitivity pixel data SH.

Specifically, the HDR combiner 54, first, determines a gain depending on the ratio of sensitivities. Next, the HDR combiner 54 normalizes the low-sensitivity pixel data SL by multiplying the low-sensitivity pixel data SL with the gain.

Next, the HDR combiner 54 performs weighting on the normalized low-sensitivity pixel data SL and the high-sensitivity pixel data SH. Then, the HDR combiner 54 combines the weighted low-sensitivity pixel data SL and high-sensitivity pixel data SH to generate HDR pixel data (HDR_RAW pixel data). The generated HDR_RAW pixel data is output to the delay unit 55.

The delay unit 55 delays HDR_RAW pixel data input from the HDR combiner 54 and outputs the delayed HDR_RAW pixel data to the corrector 56.

Since the processing performed in the luminance image generator 51 and the luminance-image-to-gain converter 52 takes longer than the processing performed in the HDR combiner 54, the delay unit 55 accommodates the time difference.

When HDR_RAW pixel data is input from the delay unit 55 and a gain is input from the luminance-image-to-gain converter 52, the multiplier for tone mapping 335 of the corrector 56 multiplies a luminance value of the HDR_RAW pixel data by the gain to output the multiplication result to the color processor 336.

Specifically, the size of the luminance image data P is a quarter of the size of HDR_RAW image data, one luminance pixel data corresponds to four pixel data of HDR_RAW image data. Accordingly, using one gain, each four HDR_RAW pixel data partitioned and arranged in Bayer pattern are tone mapped.

This causes the histogram of the luminance of HDR_RAW image data to be totally broadened.

The color processor 336 performs color interpolation processing on the HDR_RAW pixel data multiplied by the gain input from the multiplier for tone mapping 335 to generate color HDR pixel data. The generated color HDR pixel data is output to the gamma converter 338.

When color HDR pixel data is input from the color processor 336, the gamma converter 338 performs gamma conversion on the color HDR pixel data. The gamma converted pixel data is color LDR pixel data. The LDR image data is output as RGB video output signal to the display apparatus 3.

As described above, in the imaging apparatus 4 in accordance with this embodiment, the luminance image generator 51 can generate the luminance image data P using the low-sensitivity pixel data SL input from the imaging device 15, and the luminance-image-to-gain converter 52 can convert the generated luminance image data P to a gain.

In parallel with the above processing, the HDR combiner 54 can generate HDR image data from the low-sensitivity pixel data SL and high-sensitivity pixel data SH input from the imaging device 15. Then, the delay unit 55 can delay the output of the generated HDR image data to the corrector 56 to synchronize with the output of the gain. Further, the multiplier for tone mapping 335 can perform tone mapping by multiplying luminance pixel data input from the delay unit 55 by a gain input from the luminance-image-to-gain converter 52.

Thus, between the low-sensitivity pixel data SL and the high-sensitivity pixel data SH obtained by imaging the same object with the same exposure time and two sensitivities, the low-sensitivity pixel data SL is used to generate the luminance image data P, which allows the hue to be maintained over the whole dynamic range.

Further, tone mapping is performed on HDR image data based on the luminance image data P, which allows the tonality to be maintained and enables to output video with good color reproducibility over the whole dynamic range.

Further, in generating the luminance image data P, the imaging control apparatus 50 can resize the low-sensitivity pixel data SL through pixel mixing and perform filtering on the resized pixel data using an LPF to generate the luminance image data P.

This can reduce filtering load and the luminance image data P can be resized to a quarter of its size, which allows smaller size of line memories and lower cost configuration.

In the second embodiment described above, the function of the luminance image generator 51 for obtaining the low-sensitivity pixel data SL corresponds to the image data obtaining unit according to Aspect 5 or 8, and the luminance image generator 51, luminance-image-to-gain converter 52 and the LUT 53 correspond to the gain distribution generation unit according to any one of Aspects 5, 7, 8, 10, 13, 14 and 16.

Also, in the second embodiment described above, the multiplier for tone mapping 335, the color processor 336, the LM 337, the gamma converter 338 and the LUT 339 correspond to the tonal conversion unit according to any one of Aspects 5, 11, 17 and 18.

Also, in the second embodiment described above, the HDR combiner 54 corresponds to the combined image data obtaining unit according to Aspect 5, and the combined image data generation unit according to Aspect 6.

Also, in the second embodiment described above, the processing of obtaining the low-sensitivity pixel data SL in the preprocessor 51 corresponds to the image data obtaining step according to Aspect 22, and the processing of generating a gain by the luminance image generator 51, the luminance-image-to-gain converter 52 and the LUT 53 corresponds to the gain distribution generation step according to Aspect 22.

Also, in the second embodiment described above, the processing of generating HDR image data in the HDR combiner 54 corresponds to the combined image data obtaining step according to Aspect 22.

Also, in the second embodiment described above, the processing of converting the tone of HDR image data by the multiplier for tone mapping 335, the color processor 336, the LM 337, the gamma converter 338 and the LUT 339 of the corrector 56 corresponds to the tonal conversion step according to Aspect 22.

Note that, in the above embodiments, although image data to be used for generating the luminance image data P is resized, the luminance image data may be generated using blurring in place of resizing.

Also, in the above embodiments, although the HDR signal processor 30 obtains a plurality of versions of image data with different lengths of exposure time or with different sensitivities from the imaging device 10 or 15, combines the obtained plurality of versions of image data, and generates HDR image data, the invention is not limited to this.

For example, the imaging device 10 or 15 may have a unit for generating HDR image data, or another external apparatus may generate HDR image data using image data obtained from the imaging device 10 or 15. In this configuration, the LMs 330A to 330C and the HDR combiner 331 may be removed from the HDR signal processor 30.

In this case, the function of obtaining HDR image data from the imaging device 10 or 15, or an external apparatus corresponds to the combined image data obtaining unit according to Aspect 1.

Although the above embodiments are preferred illustrative embodiments of the invention with various technically preferable limitations, the scope of the invention is not intended to be limited to these embodiments unless otherwise stated to limit the invention in the above description. Also, the drawings referred to in the above description are schematic diagrams in which the horizontal and vertical dimensions of members or parts are not to scale.

Also, the invention is not intended to be limited to the above embodiments, but any variation and improvement without departing from the spirit of the invention falls within the scope of the invention.

The invention claimed is:

1. An imaging control apparatus comprising:
   an image data obtaining unit for obtaining at least one version of image data of a plurality of versions of image data obtained by imaging an object using an imaging device with different lengths of exposure time;
   a combined image data obtaining unit for obtaining a first combined image data obtained by combining at least two or more versions of image data of the plurality of versions of image data;
   a gain distribution generation unit for generating a gain distribution that is a distribution of gain factors to be used for compressing the tonal range of luminance of the first combined image data based on the image data obtained by the image data obtaining unit; and
   a tonal conversion unit for converting the tonal range of luminance of the first combined image data obtained by the combined image data obtaining unit to a tonal range narrower than the original tonal range based on a gain distribution generated by the gain distribution generation unit
   wherein,
   the gain distribution generation unit venerates luminance image data by performing filtering on the image data obtained by the image data obtaining unit to extract illumination light component from the image data, and generates the gain distribution based on the generated luminance image data,
   a value Y' of the pixel data tonal-converted by the tonal conversion unit is calculated according to the following formula (1):

$$Y' = K(P) \times Y \tag{1}$$

where Y is the value of each pixel data of the first combined image data, P is the value of each pixel data of the luminance image data, and the K(P) is a gain corresponding to the Y, and
   the gain distribution generation unit, having a lookup table storing data of the gain K(P) for a predetermined luminance value, generates the gain distribution by retrieving a gain K from the lookup table for each of a plurality of pixel data of the luminance image data.

2. The imaging control apparatus according to claim 1, wherein the imaging device, capable of reading pixel signals from each pixel in a non-destructive reading mode for reading a pixel signal depending on charge accumulated in the pixel while maintaining the charge accumulated, exposes the each pixel with the different lengths of exposure time in the order of exposure time from shortest to longest, reads the pixel signals from the each exposed pixel in the non-destructive reading mode, and outputs data of the pixel signals in the order of reading.

3. The imaging control apparatus according to claim 1, further comprising a combined image data generation unit for combining at least two or more versions of image data of the plurality of versions of image data obtained by imaging to generate the first combined image data.

4. The imaging control apparatus according to claim 3, wherein the image data obtaining unit obtains the image data with a exposure time shorter than the longest exposure time of the at least two or more versions of image data to be used for generating the first combined image data at least earlier than the combined image data generation unit obtains the image data with the longest exposure time, and wherein the gain distribution generation unit generates the gain distribution based on the earlier obtained image data with the short exposure time.

5. The imaging control apparatus according to claim 1, wherein the image data obtaining unit obtains two or more versions of image data of three or more versions of image data to be used for generating the first combined image data, and wherein the gain distribution generation unit combines two or more versions of image data obtained by the image data obtaining unit to generate a second combined image data, generates luminance image data by performing filtering on the generated second combined image data to extract illumination light component from the image data, and generates the gain distribution based on the generated luminance image data.

6. The imaging control apparatus according to claim 1, wherein the gain K(P) is calculated according to the following formula (2):

$$K(P) = 1/P_L^i \qquad (2)$$

where the exponent i is a positive real number less than or equal to 1, and $P_L$ is the luminance value of each pixel data of the luminance image data, normalized in the range of 0 to 1.

7. The imaging control apparatus according to claim 1, wherein the gain distribution generation unit combines luminance values of each of a plurality of pixel data included in the image data to be processed, for each pixel group including a predetermined number of pixels, to reduce the size of the image data, and generates a gain distribution for the each pixel group as the gain distribution based on the reduced image data.

8. An imaging apparatus comprising:

an imaging device for imaging an object with different lengths of exposure time and outputting a plurality of versions of image data corresponding to the different lengths of exposure time; and the imaging control apparatus according to claim 1.

9. An imaging control apparatus comprising: an image data obtaining unit for obtaining at least one version of image data of a plurality of versions of image data obtained by imaging an object with a plurality of pixel groups having different sensitivities using an imaging device having the plurality of pixel groups; a combined image data obtaining unit for obtaining a first combined image data obtained by combining at least two or more versions of image data of the plurality of versions of image data; a gain distribution generation unit for generating a gain distribution that is a distribution of gain factors to be used for compressing the tonal range of luminance of the first combined image data based on the image data obtained by the image data obtaining unit; and a tonal conversion unit for converting the tonal range of luminance of the first combined image data obtained by the combined image data obtaining unit to a tonal range narrower than the original tonal range based on a gain distribution generated by the gain distribution generation unit wherein, the gain distribution generation unit generates luminance image data by performing filtering on the image data obtained by the image data obtaining unit to extract illumination light component from the image data, and generates the gain distribution based on the generated luminance image data, a value Y' of the pixel data tonal-converted by the tonal conversion unit is calculated according to the following formula (1): Y'−K(P)×Y (1) where Y is the value of each pixel data of the first combined image data, P is the value of each pixel data of the luminance image data, and the K(P) is a gain corresponding to the Y, and the gain distribution generation unit, having a lookup table storing data of the gain K(P) for a predetermined luminance value, generates the gain distribution by retrieving a gain K from the lookup table for each of a plurality of pixel data of the luminance image data.

10. An imaging control method comprising:

image data obtaining step for obtaining at least one version of image data of a plurality of versions of image data obtained by imaging an object using an imaging device with different lengths of exposure time;

combined image data obtaining step for obtaining a first combined image data obtained by combining at least two or more versions of image data of the plurality of versions of image data;

gain distribution generation step for generating a gain distribution that is a distribution of gain factors to be used for compressing the tonal range of luminance of the first combined image data based on the image data obtained in the image data obtaining step; and tonal conversion step for converting the tonal range of the first combined image data obtained in the combined image data obtaining step to a tonal range narrower than the original tonal range based on a gain distribution generated in the gain distribution generation step wherein, the gain distribution generation step venerates luminance image data by performing filtering on the image data obtained by the image data obtaining unit to extract illumination light component from the image data, and generates the gain distribution based on the generated luminance image data, a value Y' of the pixel data tonal-converted by the tonal conversion step is calculated according to the following formula (1);

$$Y' = K(P) \times Y \qquad (1)$$

where Y is the value of each pixel data of the first combined image data, P is the value of each pixel data of the luminance image data, and the K(P) is a gain corresponding to the Y, and the gain distribution generation step generates the gain distribution by retrieving a gain K from a lookup table storing data of the gain K(P) for a predetermined luminance value for each of a plurality of pixel data of the luminance image data.

* * * * *